(12) United States Patent
Munday

(10) Patent No.: US 8,321,460 B2
(45) Date of Patent: Nov. 27, 2012

(54) POPULATING A CACHE SYSTEM BASED ON PRIVILEGES

(75) Inventor: Terence Joseph Munday, Menlo Park, CA (US)

(73) Assignee: Oracle International Corporation, Redwood Shores, CA (US)

( * ) Notice: Subject to any disclaimer, the term of this patent is extended or adjusted under 35 U.S.C. 154(b) by 287 days.

(21) Appl. No.: 12/482,717

(22) Filed: Jun. 11, 2009

(65) Prior Publication Data

US 2010/0318569 A1 Dec. 16, 2010

(51) Int. Cl.
G06F 7/00 (2006.01)

(52) U.S. Cl. .......................... 707/783; 707/784

(58) Field of Classification Search .................. 707/721, 707/769, E17.017, E17.12, 999.002, 999.009, 707/783–785; 705/7.14, 7.17, 320
See application file for complete search history.

(56) References Cited

U.S. PATENT DOCUMENTS

| | | | | |
|---|---|---|---|---|
| 5,261,102 A * | 11/1993 | Hoffman | | 726/19 |
| 6,061,678 A * | 5/2000 | Klein et al. | | 1/1 |
| 6,675,261 B2 * | 1/2004 | Shandony | | 711/121 |
| 7,251,655 B2 * | 7/2007 | Kaler et al. | | 1/1 |
| 7,363,650 B2 | 4/2008 | Moriconi et al. | | |
| 7,503,062 B2 | 3/2009 | Wong et al. | | |
| 7,506,102 B2 * | 3/2009 | Lev-Ran et al. | | 711/118 |
| 7,950,049 B2 * | 5/2011 | Chiou et al. | | 726/4 |
| 2002/0019822 A1 * | 2/2002 | Seki et al. | | 707/10 |
| 2006/0265377 A1 * | 11/2006 | Raman et al. | | 707/9 |
| 2007/0033191 A1 * | 2/2007 | Hornkvist et al. | | 707/9 |
| 2008/0022370 A1 * | 1/2008 | Beedubail et al. | | 726/4 |
| 2008/0126945 A1 * | 5/2008 | Munkvold et al. | | 715/733 |
| 2008/0168048 A1 * | 7/2008 | Bell et al. | | 707/5 |
| 2009/0094682 A1 | 4/2009 | Sage et al. | | |
| 2009/0235084 A1 * | 9/2009 | Ferraro et al. | | 713/182 |
| 2010/0281060 A1 * | 11/2010 | Ahmed et al. | | 707/785 |

OTHER PUBLICATIONS

Ferraiolo et al; "Role-Based Access Controls"; 15th National Computer Security Conference; 1992; Baltimore, MD; pp. 554-563.

* cited by examiner

Primary Examiner — Charles Kim
Assistant Examiner — Randall Burns
(74) Attorney, Agent, or Firm — Squire Sanders (US) LLP

(57) ABSTRACT

A cache system is updated upon determining that a current privilege has not been checked for the session. Updating the cache system includes receiving all data items that are accessible for the current privilege. The cache system stores each received data item in association with a privilege set. The privilege set is enabled to include at least one privilege that is granted for the corresponding data item. The current privilege is stored in the privilege set of each data item when the cache system is updated based on the current privilege.

21 Claims, 14 Drawing Sheets

POPULATING A CACHE SYSTEM BASED ON PRIVILEGES

FIELD OF THE INVENTION

One embodiment is directed generally to a cache system, and in particular to a cache system involving function and data security.

BACKGROUND INFORMATION

In some application programs, users are authorized to access only certain functions and data. Often times, these application programs interact with a database system, which implements security policies to ensure that a particular user accesses only those functions and data, which he/she is permitted to access based on predetermined security privileges.

As an example, applications involving Human Resource Management ("HRM") may provide each authorized user with limited access to a particular set of data and functions within the application program. These restrictions may be based on predetermined security privileges that are set forth in accordance with a user's assigned role. For example, a manager may have permission to access only those employees that he supervises. In addition, the manager may be permitted to perform a limited menu of actions, such as promoting his employee, evaluating his employee, and viewing employment information concerning his employee. To implement these security policies, some HRM application programs may interact with a database system to determine if certain functions and/or data are accessible to a particular user in a given instance.

For example, for a given session, an HRM application program may provide an authorized user with the ability to select at least one data item from a user interface. Each data item may refer to the name of an employee within a company. Upon selecting a set of data items, the HRM application program may be configured to interact with a database system to determine a menu of actions, if any, that the current user is permitted to perform on the entire set of selected data items. In other words, the HRM application program may be configured to render and display a menu of actions that are permitted for the current user for a given instance when the user selects a number of data items. One implementation of an HRM application program interacting with a database system to render a menu of privileges for a set of selected data items in a user interface is illustrated in FIG. 1.

In FIG. 1, user U1 selects a number of data items 102 in the application program, which is associated with system 130. To render a menu of actions that the user is permitted to perform on the selected data items, system 130 is configured to initiate a privilege check for all potential privileges (e.g., privileges P1-P10), which may be displayed in menu M1. In general, a privilege is a permission to perform at least one action. If it is determined that the current privilege $P_i$, which is being checked, has been granted to the user in this particular instance for the entire set of selected data items, then the privilege will be displayed in menu M1. The following general scenario discusses a privilege check, which is being performed for privilege P1.

To determine if user U1 has the privilege P1 for the set of selected data items (e.g., set of employee names), system 130 executes a query 104 to the database system 30. System 130 is set up to execute the query upon receiving the user's selection of data items 102. The query is configured to determine all authorized data items that are available to user U1 for privilege P1 in this instance. In response to an executed query, database system 30 checks privilege P1 based on user U1 and returns all of authorized data items. System 130 performs an evaluation 108 by comparing the selected data items with the list of authorized data items, received from the result set.

If each of the selected data items from 102 is listed as an authorized data item, then system 130 permits the user to render that particular action 110, associated with privilege P1, for the set of selected data items. At 112, system 130 performs a privilege check for the next privilege within the potential set of privileges, which may be displayed in menu M1, by executing a query for the next privilege.

If at least one of the selected items from 102 is not in the query result set, then system 130 indicates that privilege P1 is not available to user U1 by not providing privilege P1 as an option in menu M1. At 114, system 130 performs a privilege check for the next privilege within the potential set of privileges, which may be displayed in menu M1, by executing a query for the next privilege.

In order to render and display menu M1, system 130 needs to perform a privilege check for each privilege within the set of potential privileges. Each privilege check involves executing a query for the privilege, which is being checked. If the set of privileges to be checked is large, then a large number of queries will be performed.

As explained above, such a configuration experiences many drawbacks. Since these application programs require at least one query to the database system in each instance that the system needs to determine if an action, associated with a particular privilege, is available for a selected set of data items, these application programs may experience relatively slow response times. In addition, the user may have to wait a relatively long time to receive a menu for the selected data items. Overall, the user interfaces ("UIs") associated with the application program may be sluggish, thereby providing an overall poor experience. In addition, the network itself may be impacted and overloaded by the overwhelming number of communications between the application program and the database system.

SUMMARY OF THE INVENTION

One embodiment is a cache system that provides the processor and application program with rapid access to a copy of data that is stored elsewhere. The cache system is updated upon determining that a current privilege has not been checked for a session. Updating the cache system includes receiving all data items that are accessible for the current privilege. The cache system stores each received data item in association with a privilege set. The privilege set is enabled to include at least one privilege that is granted for the corresponding data item. The current privilege is stored in the privilege set of each data item when the cache system is updated based on the current privilege.

DETAILED DESCRIPTION

One embodiment is a cache system that provides the processor and application program with rapid access to a copy of data that is stored in a database system. The cache system is enabled to receive a privilege check for a set of selected data items and is enabled to determine if the privilege is available for the set of selected IDs by using data stored in a privilege cache or by querying the database system. If a query is sent to the database system, then the cache system is enabled to selectively populate a privilege cache based on results of the query, thereby allowing subsequent privilege checks to be able to receive rapid access to this cached copy.

Figure 1:
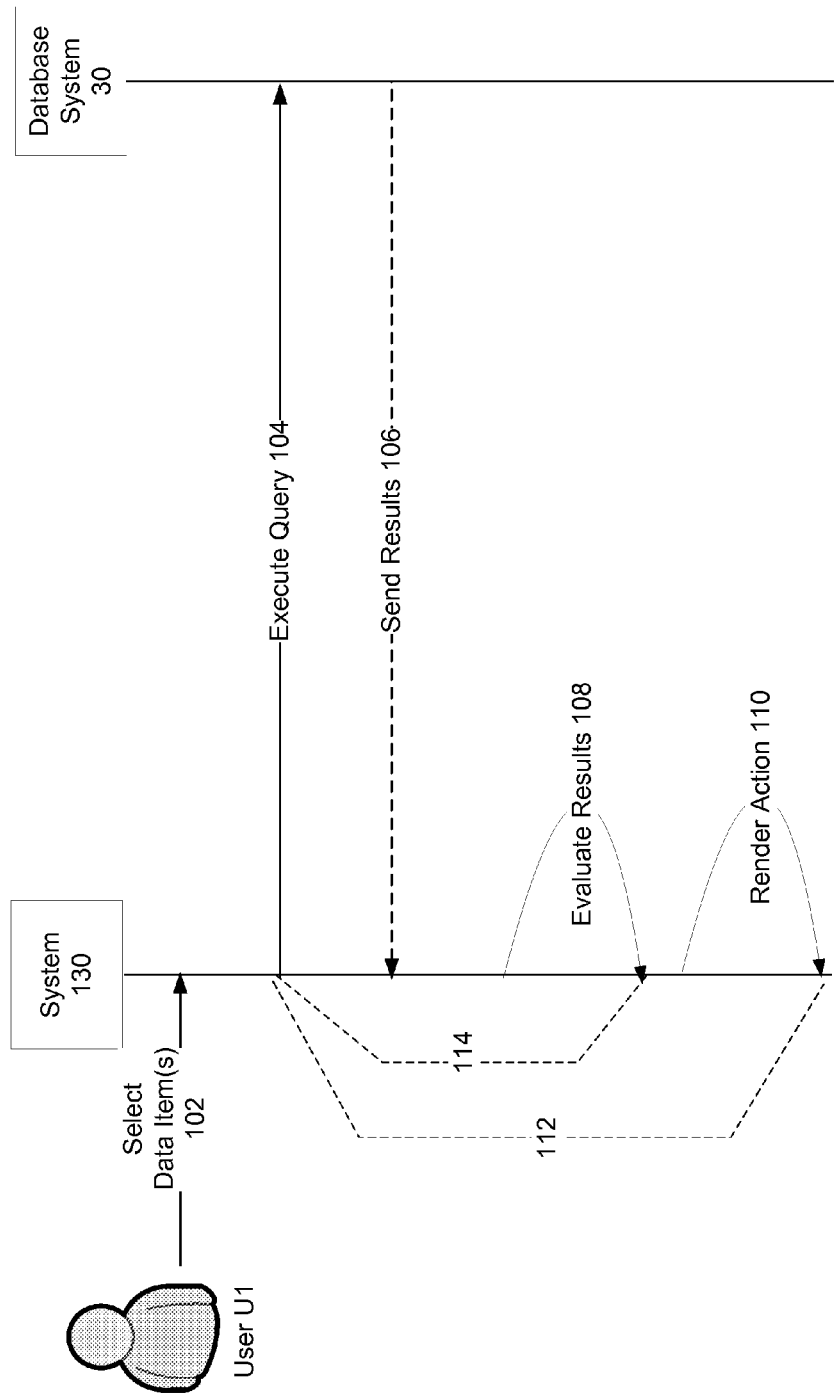
FIG. 1 is a block diagram of a system implementing security privileges in accordance with related art.
Figure 2:
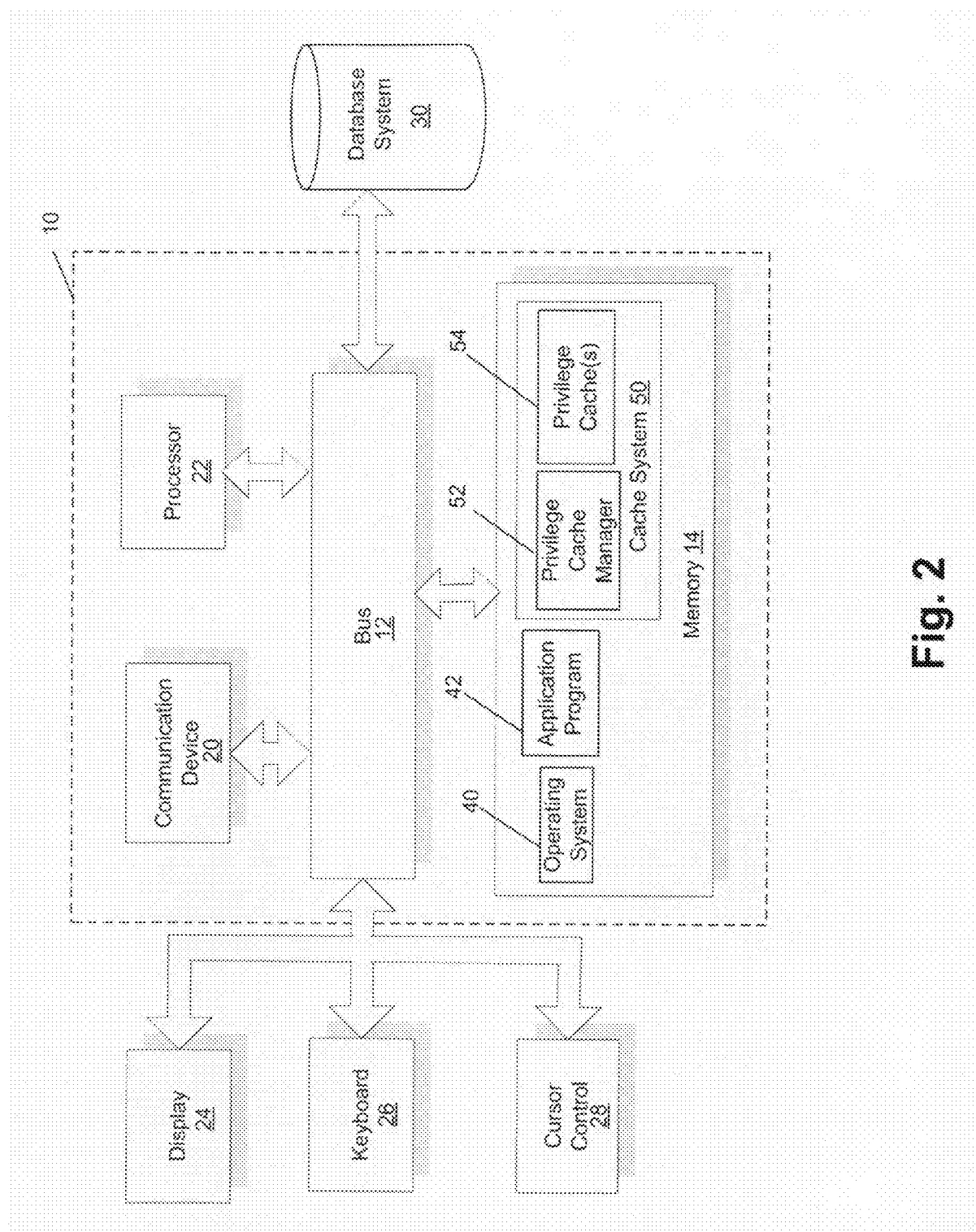
FIG. 2 is a block diagram of a cache system that is configured to implement one embodiment of the present invention.

FIG. 2 is a block diagram of a system 10 that can implement one embodiment of the present invention. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network or any other method.

Computer readable media may be any available media that can be accessed by processor 22. The media may include volatile media, nonvolatile media, removable media, non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD"), for displaying information to a user. A keyboard 26 and a cursor control device 28, such as a computer mouse, are coupled to bus 12 to enable a user to interface with system 10.

In one embodiment, memory 14 stores software modules that provide functionality when executed by processor 22. In other embodiments, each of the modules may be stand-alone systems and not integrated with system 10, or may be part of any other system.

The modules include an operating system 40 that provides operating system functionality for system 10. The modules further include an application program 42. Application program 42 is a computer program designed to perform a certain type of work. For example, application program 42 may be an Oracle Fusion application with a multi-faceted security model that is enabled to restrict the functionality and/or data that is made available to a particular user or a particular session. Application program 42 may employ a role based access control ("RBAC") system, or a role based security system, in which the functions and/or data that an authorized user may access is restricted based on predefined roles.

Although the present disclosure discusses a number of examples with respect to an HRM application, it is recognized that the present disclosure is not limited to any particular HRM application, but may be applied to any type of application program that relates to restricting functions and/or data via a database system.

Figure 10:
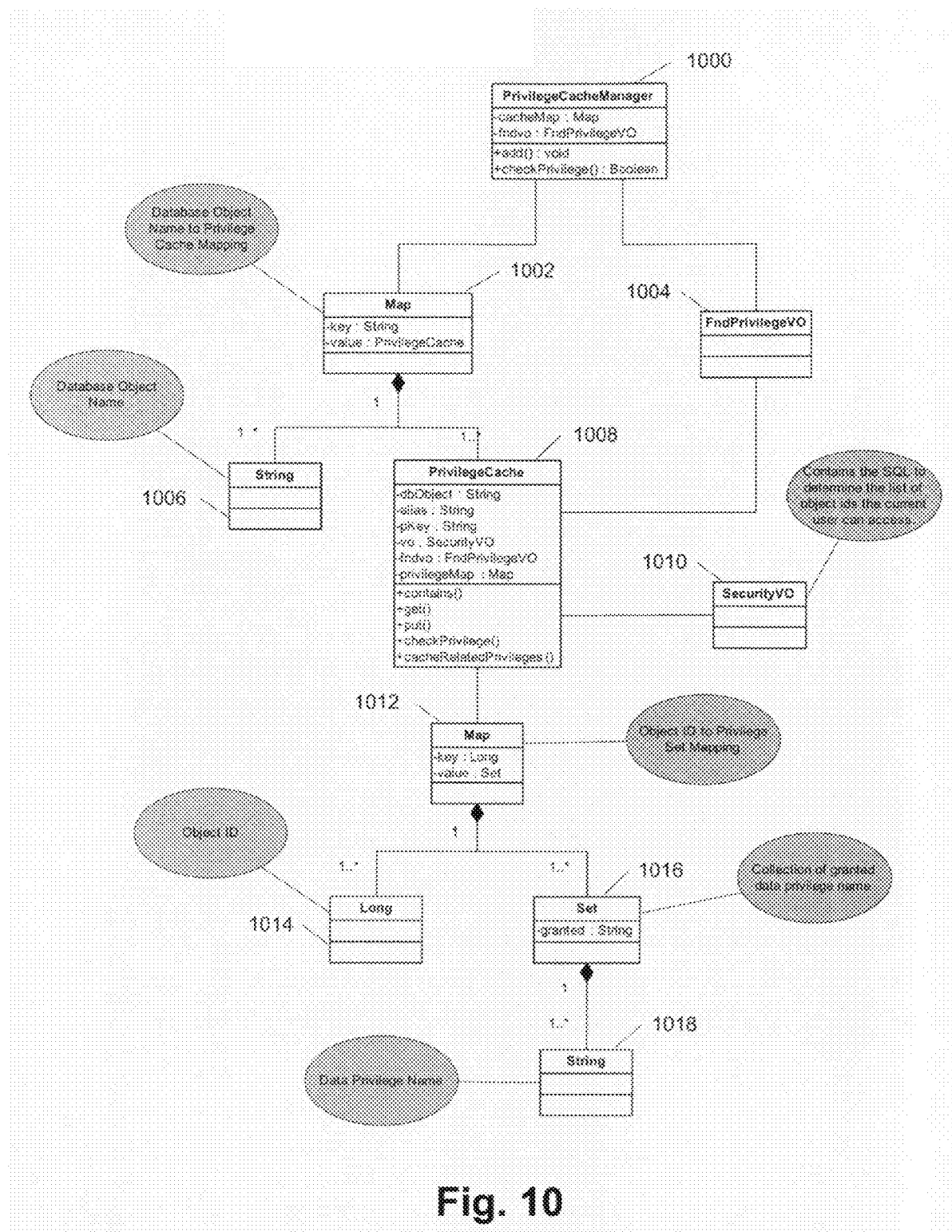
FIG. 10 illustrates a class diagram of the cache system in Unified Modeling Language ("UML") in accordance with one embodiment.

The modules include a cache system 50, which may be represented and traversed as a tree of maps as shown in FIG. 10. Cache system 50 includes a privilege cache manager 52 and a number of privilege caches 54. Privilege cache manager 52 manages privilege caches 54. A privilege cache 54 is a temporary storage area that is enabled to provide rapid access to a copy of data that is stored elsewhere. Data that is stored elsewhere, generally, takes longer to access in comparison to the copy that resides in the privilege cache itself. As shown in FIG. 2, privilege cache 54 may contain a copy of data that is stored in database system 30. In this case, processor 22 would be able to access a cached copy of the data from privilege cache 54 significantly faster than fetching the same data from database system 30.

Database system 30 of FIG. 2 is coupled to bus 12 and is used to store data for the various modules. Database system 30 can be any type of database, such as a relational database. In relationship database designs, keys are used to refer unambiguously to a specific row of a table. Keys, generally, refer to a minimal set of columns that contain a different combination of values for each row of a table. A simplified example of keys may be a column of Social Security Numbers that uniquely identify a specific row of information pertaining to a particular individual and his/her associated information within a table. A table may have a number of keys. However, each table may have only one primary key. A primary key is a nominated column or combination of columns that has a different value for every row in the table.

Database system 30 is configured to implement the data security infrastructure, which determines if certain data and/or functionalities are permitted to be accessed. Data security infrastructure includes a number of security policies and a number of data security subsystems, which are implemented in accordance with security objectives.

Figure 3:
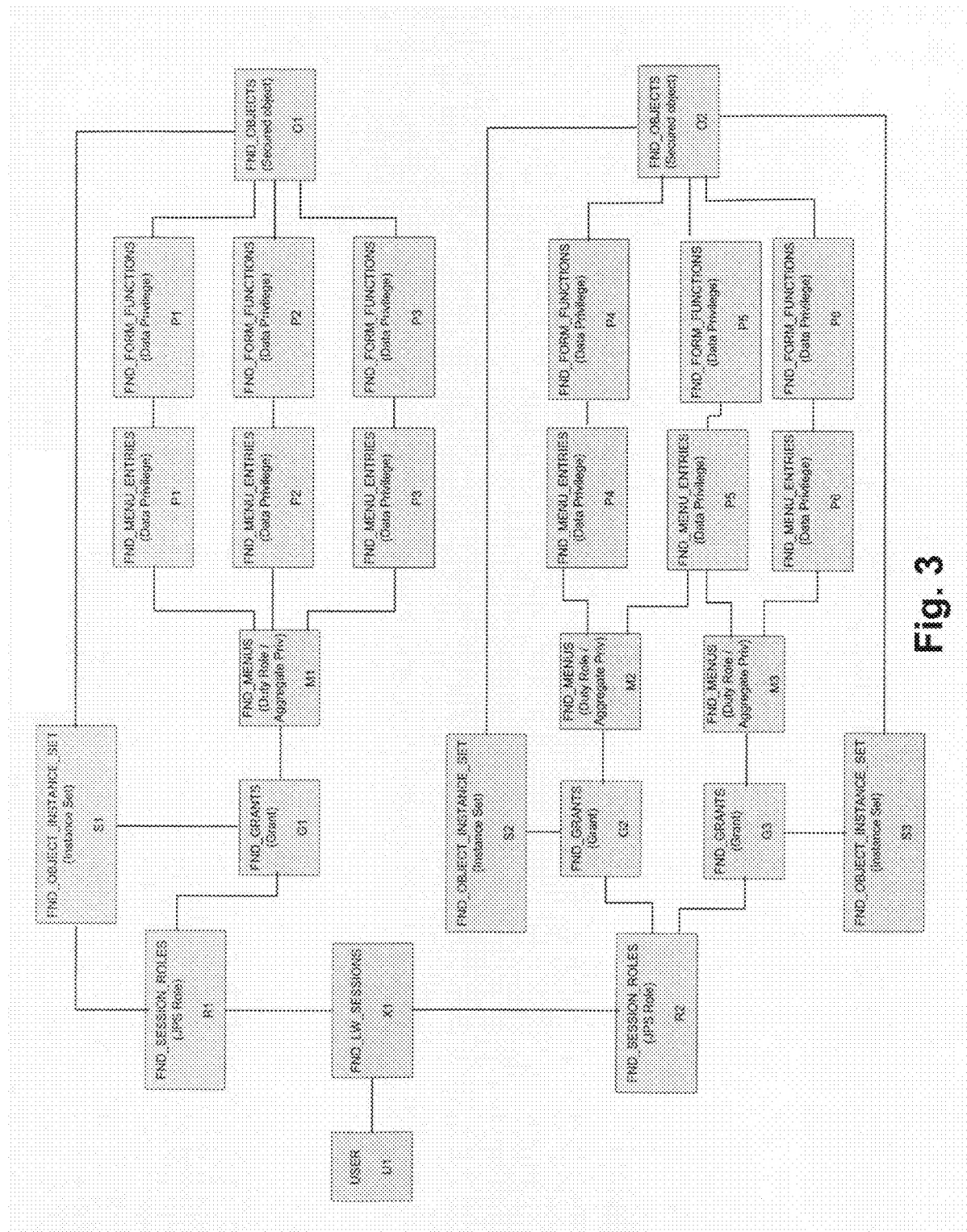
FIG. 3 illustrates an example of a data security subsystem that may be implemented for a security infrastructure of a database system in accordance with one embodiment.

FIG. 3 illustrates an example of a data security subsystem that may be implemented for a security infrastructure of database system 30 in accordance with one embodiment. The security infrastructure includes a number of data security subsystems. For example, as illustrated in FIG. 3, a data security subsystem may correspond to a particular user.

Each data security subsystem includes a number of secured data objects. A secured data object is accessible if the security infrastructure includes a predetermined relationship between the requester (e.g., user) and the secured data object.

In this particular data security infrastructure, the data security policies set forth a relationship between a user and a secured data object, which involves a session, a role, a grant, an instance set, a menu (i.e., an aggregate set of privileges), a menu entry (e.g., a connection point to a menu), and a privilege. The security infrastructure is defined such that a user is associated with a session. For a given session, a number of roles may be provisioned to the user. Each role includes a number of grants. Each grant associates an aggregate set of privileges (e.g., menu) with a role. The aggregate set of privileges include a number of privilege entries, which reference a number of privileges. Each privilege refers to a secured object. A secured object includes a number of data items with corresponding primary keys (e.g., "object IDs"). In addition, an instance set associates a grant to a secured object, and includes a mechanism that extracts particular information based on certain criteria. For example, an instance set in one embodiment is an "SQL WHERE" clause (i.e., predicate) that will be applied to an SQL query against the secured object. If a user is mapped to a secured data object, as discussed above, then the security infrastructure permits the user to perform the privilege on the secured object.

FIG. 3 illustrates a security infrastructure that provides a data security subsystem, which enables user U1 to access secured object O1 and secured object O2, respectively. When employed by an application program 42 and database system 30, data security subsystem assigns a session X1 to user U1 whenever user U1 logs onto system 10. For a given session, user U1 is provisioned two roles. For example, in an HRM application, user U1 may be a benefits analyst, who also manages a number of employees. In this case, user U1 is assigned a manager role R1 and a benefits analyst role R2. As a manager R1, user U1 is granted access to a menu M1 of actions, which correspond to privileges and may be performed on object IDs contained within secured object O1. Menu M1 includes privileges P1, P2, and P3. As a benefits analyst R2, user U1 is granted access to menus M2 and M3, which may be performed on object IDs contained within secured object O2. Menus M2 includes privileges P4 and P5. Menu M3 includes privileges P5 and P6.

In the event that user U1 selects a set of data items, then a set of potential privileges (e.g. privileges P1-P10) for menu M1 are evaluated to determine if they should be displayed in menu M1 for those selected data items. Menu M1 displays only those privileges held by the current user in a given role during a given session. In this example, user U1 is permitted to perform actions, associated with privileges P1, P2, and P3 for object IDs, which are contained in secured object O1. Accordingly, application program 42 is enabled to display a menu M1 that contains privileges P1, P2, and P3. However, menu M1 does not contain privileges P4-P10 because privileges P4-P10 have not been granted to user U1 in this particular instance set. Thus, if user U1 selects privilege P2 from menu M1 for the set of selected data items, then the HRM application permits privilege P2 to be performed.

In the alternative, if user U1, while in role R1, selects at least one data item, which corresponds to an object ID, which is not contained within secured object O1, then user U1 will not receive a menu, containing privileges P1, P2, and P3. In this instance, a value of "false" will be returned to the application program to indicate that user U1 does not have access to menu M1 for the selected data items.

As discussed above, FIG. 3 illustrates a data security subsystem that has been specified for a particular user of the application program. A data security subsystem set forth for another user may include, for example, a different number of roles, grants, menus, privileges, and secured objects.

Figure 4:
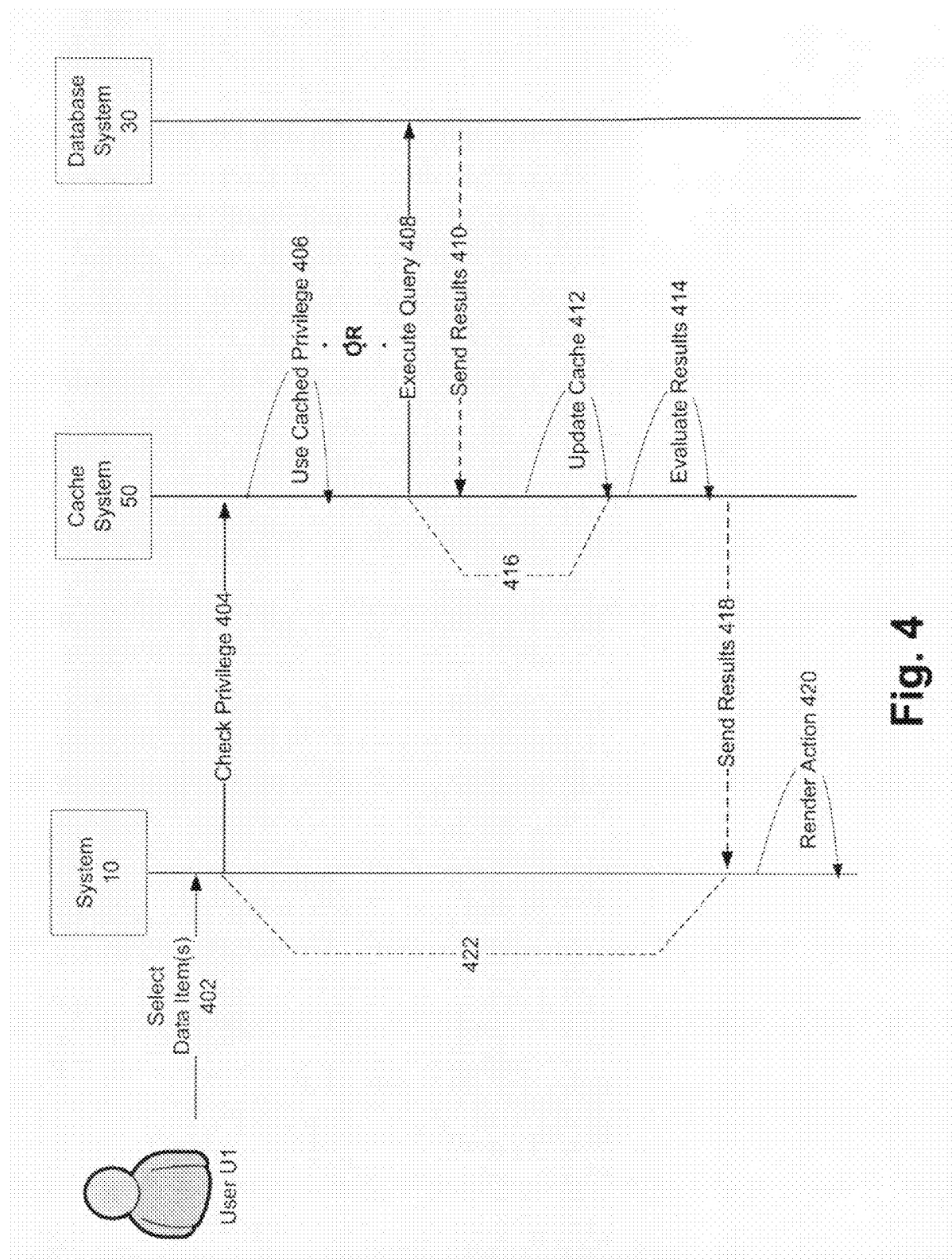
FIG. 4 is a sequence diagram illustrating the cache system in accordance with one embodiment.

FIG. 4 is a general sequence diagram, illustrating the overall performance that is gained using a cache system in accordance with one embodiment.

As shown in FIG. 4, a user selects one or more data items 402. Each data item may be identified by a primary key. System 10 receives the primary keys, associated with the selected data items. Upon receiving the primary keys, system 10 invokes a command to evaluate which actions within a set of potential privileges (e.g., privileges P1-P10) is enabled to be displayed in a menu of actions for the selected data items. To determine whether a particular action may be displayed in a menu, system 10 performs a privilege check for a particular privilege within the set of potential actions 404. In this case, a privilege check is performed on privilege P1 for the set of selected data items.

At 404, system 10 routes the privilege check to cache system 50. Cache system 50 checks if privilege P1 is one of the privileges, which has already been checked. Since this is the first instance in which a selection of data items has been made, cache system 50 does not contain P1 in its list of checked privileges. Thus, cache system 50 cannot determine if user U1 is permitted to perform privilege P1 on the selected IDs based on data contained in its memory. Cache system 50 thus queries database system 30 to determine all data items on which the user U1 has permission to perform privilege P1 (408).

At 410, database system 30 returns results of the query. In particular, database system 30 returns a complete list of data items (e.g., object IDs) on which user U1 has permission to perform privilege P1. Database system 30 may also return other relevant data.

Figure 5:
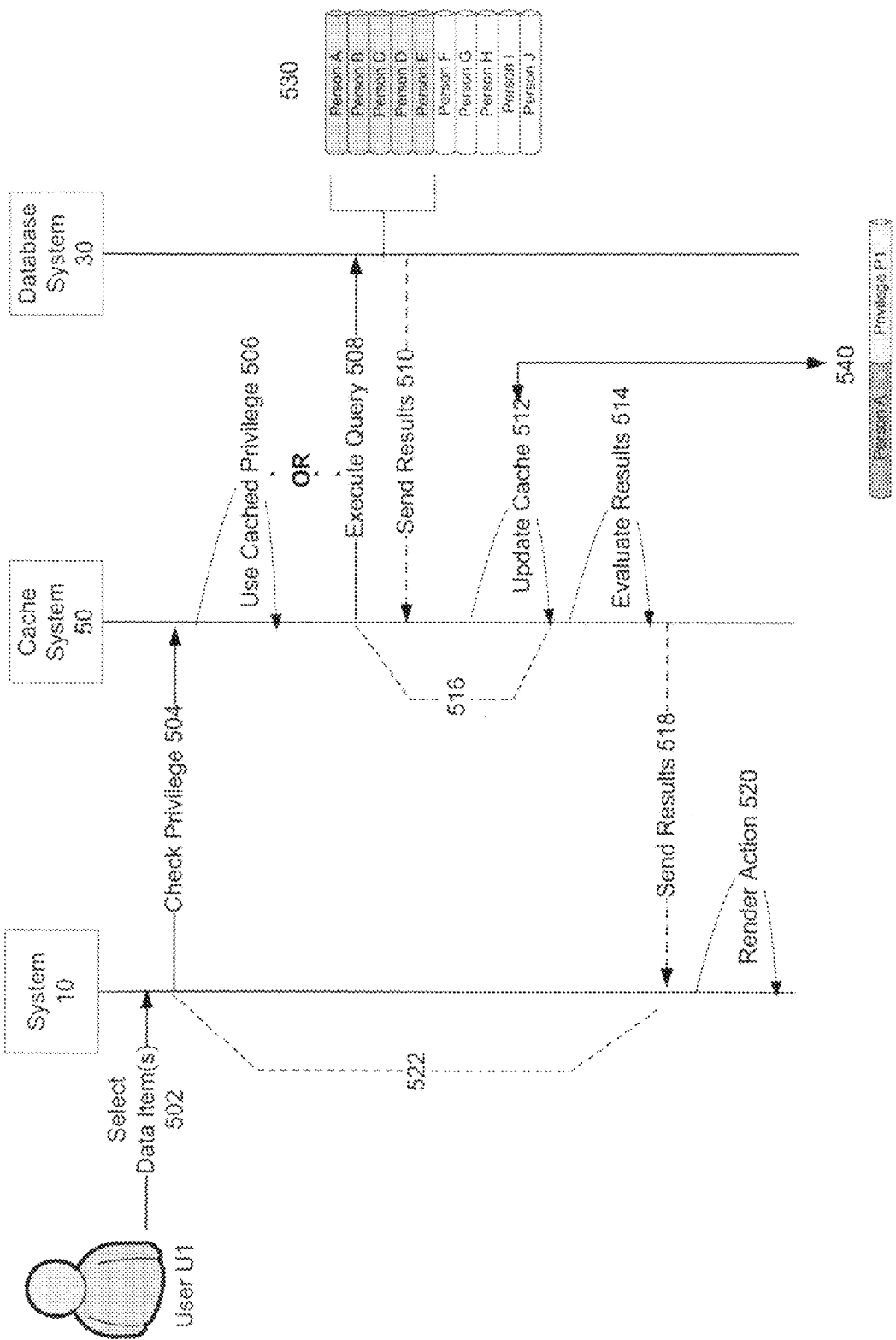
FIG. 5 is a sequence diagram in which the cache system is selectively populated with data in accordance with one embodiment.
Figure 6:
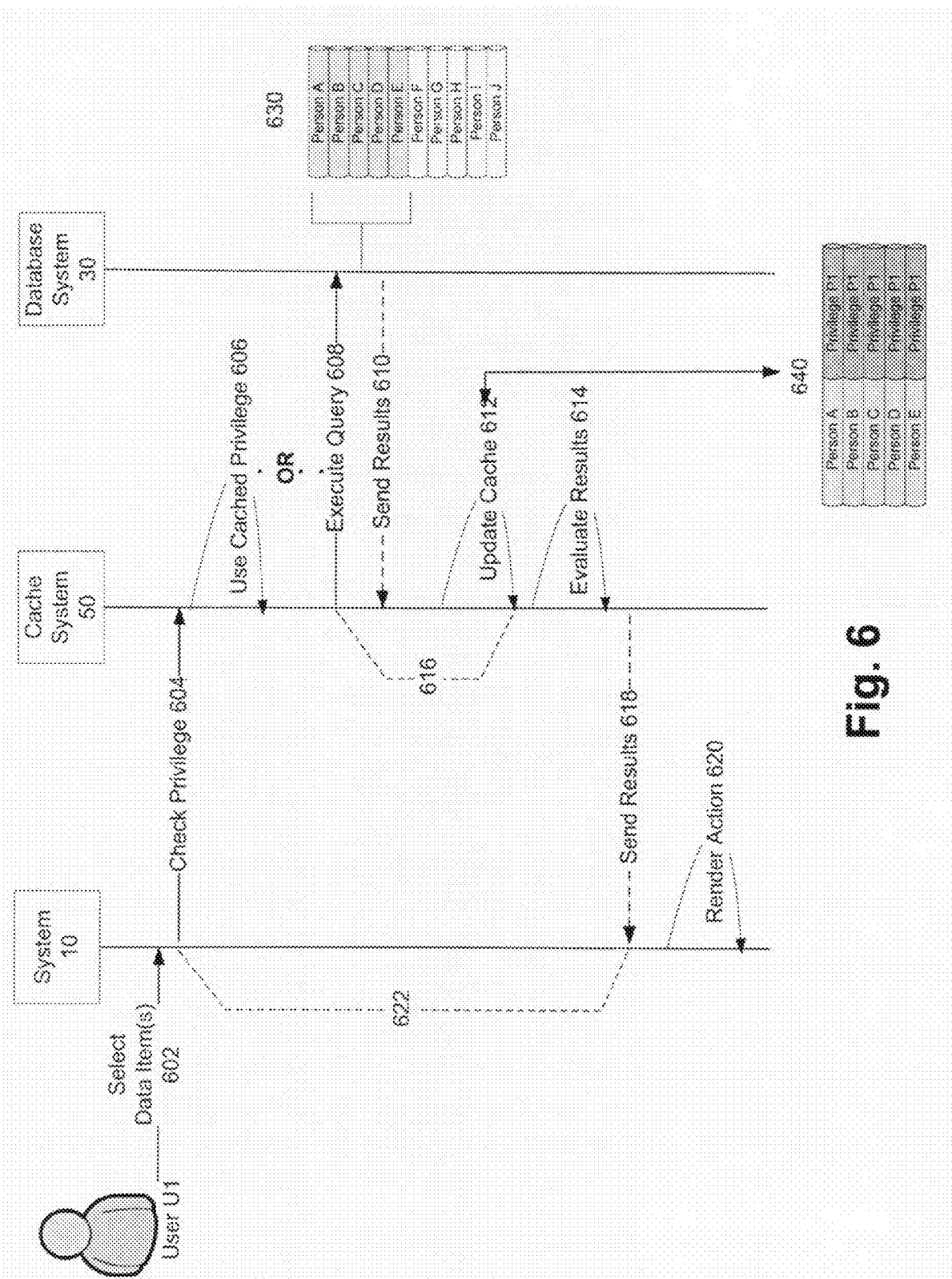
FIG. 6 is a sequence diagram in which the cache system is selectively populated with data including all data items of a current privilege in accordance with one embodiment.
Figure 7:
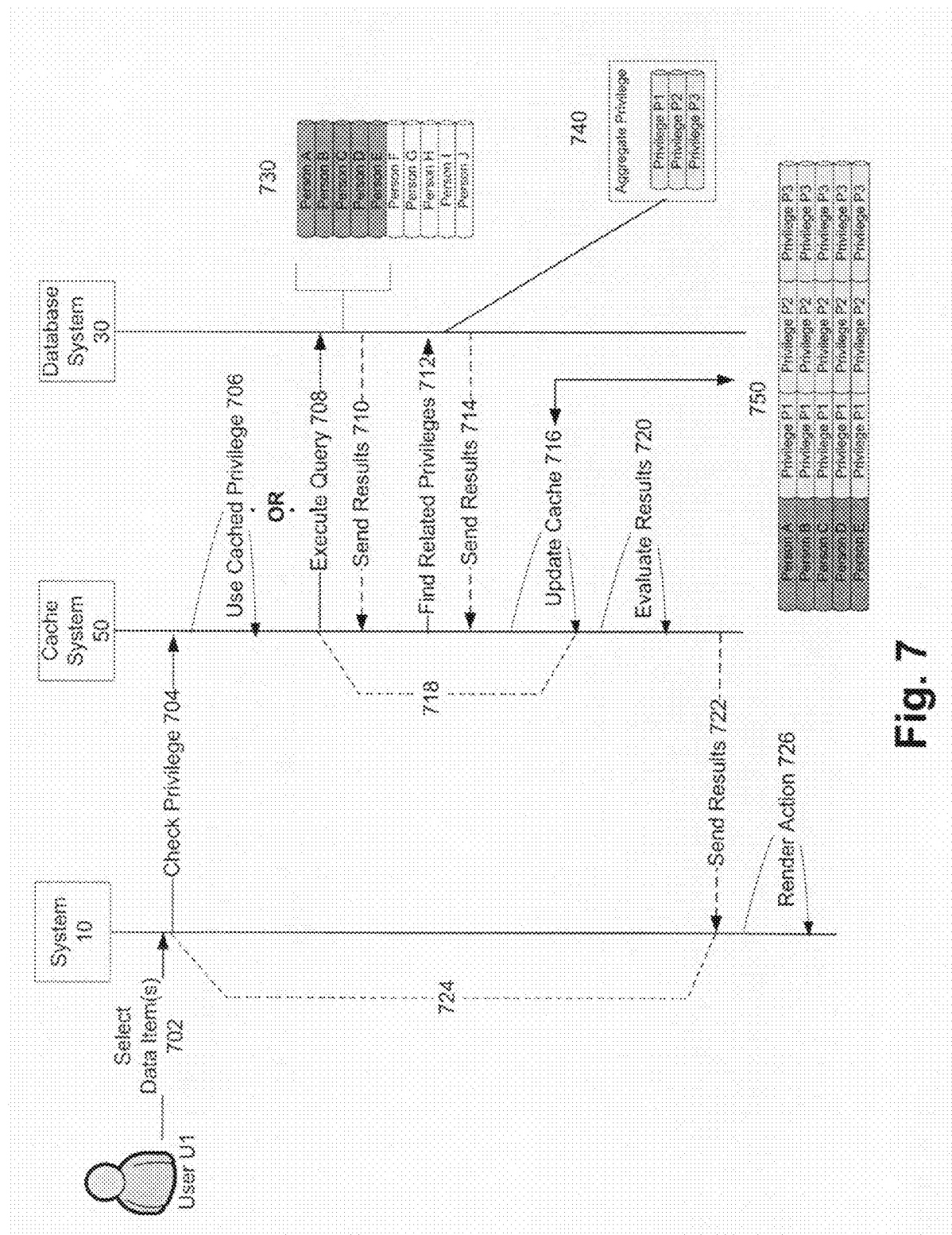
FIG. 7 is a sequence diagram in which the cache system is selectively populated with data including all data items of a current privilege and all related privileges of the current privilege in accordance with one embodiment.

At 412, cache system 50 is updated to store data in accordance with a number of determinations, as discussed, for example, with respect to FIGS. 5-7.

At 414, cache system 50 determines if user U1 may perform privilege P1 on the set of data items of 402. Cache system 50 is able to make this determination by comparing the set of selected data items with the data items, received from the query result set. As indicated above, the query result set returns a complete list of data items (e.g., object IDs), which user U1 has permission to perform privilege P1 on. If each of the selected data items from step 402 is in the query result set, then cache system 50 determines that user U1 has permission to perform P1 on the set of selected data items of 402. If at least one of the selected data items of 402 is not in the query result set of 410, then cache system 50 determines that user U1 does not have permission to perform P1 on the selected IDs.

After evaluating the results of the query, cache system 50 returns the results to system (418). System 10 also performs a privilege check for each of the remaining potential privileges, e.g. P2-P10 (422), which could possibly be displayed in menu M1. System 10 allows application program 42 to display P1 in menu M1 for user U1, as well as P2-P3 upon determining that these privileges have been granted to user U1 for role R1, as shown in FIG. 3. System 10 permits the action associated with privilege P1 to be rendered at 420 when user U1 selects privilege P1 in menu M1 for the selected IDs (420). When the privilege does not exist in the cache and privilege has been previously checked, system 10 returns to 408, 410 and 412 via 416.

As discussed above, FIG. 4 provides a general sequence diagram involving a cache system in accordance with one embodiment. Meanwhile, FIGS. 5-7 illustrate the cache system of FIG. 4 being selectively populated with data.

FIG. 5 is a flow diagram with respect to an HRM application program, illustrating the improved system performance that is gained using a cache system in accordance with one embodiment.

In FIG. 5, user U1 selects a data item, e.g., person A (502). The potential actions that can be performed on person A include privileges P1-P10. If these privileges are available to user U1, then privileges P1-P10 will be displayed in menu M1. To render menu M1 of potential actions for user U1, system 10 performs a privilege check for privilege P1 with respect to a primary key of the selected data item (i.e., person A).

At 504, system 10 routes the privilege check request to cache system 50. Cache system 50 checks if privilege P1 is in the cache system 50.

Since this is the first selection for this session, system 10 is unable to retrieve this information from the cache, and thus executes a query to database system 30 (508).

At 508, a query is performed for user U1 in role R1 based at least on privilege P1 and the selected data item (i.e., Person A). The security infrastructure determines that user U1 has permission via privilege P1 to perform corresponding actions on Person A, Person B, Person C, Person D, and Person E (530).

At 510, a result from query 508 is returned to cache system 50 (510). The query result is a set of all data items that user U1 has for privilege P1, as shown at 530.

At 512, cache system 50 is updated to include a primary key of Person A and corresponding privilege set {P1} (540), which is the basis of the privilege check. However, cache system 50 is not updated to include information about person B, Person C, Person D, or Person E, at this point in time.

At 514, cache system 50 evaluates the results. Cache system 50 determines that P1 may be performed on Person A because the updated cache contents, shown at 540, indicates that Person A is one of the people (i.e., one of the data items) that is accessible to user U1 based on privilege P1.

At 518, once the results have been evaluated at 514, cache system 50 returns the evaluation results to system 10. To render menu M1, system 10 also performs a privilege check for the remaining potential privileges P2-P10 (522). System 10 determines that privileges P1-P3 may be displayed in menu M1 for user U1, as indicated in the data security subsystem of FIG. 3. System 10 thus displays privileges P1, P2, and P3 in menu M1 of the HRM application program for the set of selected data items (i.e., "Person A").

At 520, system 10 renders the action associated with privilege P1 when user U1 selects privilege P1 from menu M1.

At a later time (e.g., after the cache system has been updated at 512, 540), should user U1 decide to select Person A and check privilege P1, then system 10 is able to use the cached privilege (506) because it receives a hit when it checks cache system 50 for privilege P1 and Person A, as shown at 540. When the privilege does not exist in the cache at 506 and privilege has been previously checked, system 10 returns to 508, 510 and 512 via 516.

Based on its evaluation (514), cache system 50 determines that privilege P1 may be performed on Person A and thus returns a result of "true" to the system (518). Based on this privilege check, system 10 determines that P1 may be displayed in menu M1, and allows the action to be performed. By using the cached copy of this data (i.e., Person A, Privilege P1), system 10 saved itself from having to perform another query, which would have resulted in another costly trip to database system 30.

In the event that user U1 selects Person B and causes a privilege check to be performed on privilege P1 (e.g., after the cache system has been updated at 512, 540), system 10 would undergo the same general process, as discussed above. However, cache system 50 would not be able to determine if privilege P1 is available to the selected data item (i.e. "Person B") based on the data (i.e., Person A; Privilege P1) in cache system 50. To determine if P1 is able to be performed on Person B, cache system 50 would need to execute a new query (508). FIG. 6 illustrates a manner of selectively populating cache system 50 to obviate the need to perform a query in this instance.

FIG. 6 illustrates a sequence diagram with respect to an HRM application program, illustrating the improved system performance that is gained using a cache system that stores more than the instant selection of object IDs and the privilege, which is being checked. In FIG. 6, cache system 50 stores the entire query result that is received from database system 30.

At 602, user U1 selects one or more data items, e.g. person A. The potential actions that can be performed on person A include privileges P1-P10. If these privileges are available to user U1, then privileges P1-P10 will be displayed in menu M1. To render menu M1 of actions for user U1, system 10 performs a privilege check for each potential action.

At 604, system 10 performs a privilege check for privilege P1. Cache system 50 checks if privilege P1 is in its cache memory by consulting a list of privileges, which have been checked. Since this is the first selection for this session, privilege P1 is not in the list. System 10 is unable to retrieve this information from cache system 50.

At 608, system 10 executes a query to database system 30. A query is performed based in part on the privilege name (P1). As shown at 630, database system 30 determines that user U1 has permission via privilege P1 to perform actions on Person A, Person B, Person C, Person D, and Person E via the security infrastructure, shown in FIG. 3.

At 610, database system 30 returns the query result set (630) to cache system 50.

At 612, cache system 50 is updated to include all of the information obtained from the query result set, and not just information pertaining to the user's selection (i.e., Person A and Privilege P1). Cache system 50 stores each data item on which user U1 is authorized to perform privilege P1. Cache system further indicates that user U1 has permission to perform P1 for each of these authorized data items, as shown in 640. As illustrated in FIG. 6, cache system 50 stores all data items, received from the query result set. In association with each data item, cache system 50 stores a corresponding privilege set. As shown at 640, cache system 50 stores the following: a primary key of Person A and a corresponding privilege set {P1}; a primary key of Person B and a corresponding privilege set {P1}, a primary key of Person C and a corresponding privilege set {P1}; a primary key of Person D and a corresponding privilege set {P1}, a primary key of Person E and a corresponding privilege set {P1}.

At 614, cache system 50 evaluates the query result set, which is now stored in a privilege cache within cache system 50. Cache system 50 determines that privilege P1 may be performed on Person A because the query result set indicates that Person A is one of the data items that is granted to user U1 based on privilege P1. In addition, cache system 50 updates the list of privileges, which have been checked. The updated list now indicates that privilege P1 has been checked. This contrasts with the process of FIG. 5 in which cache system 50 was only updated with information pertaining to the selected data item (i.e., Person A).

At 618, cache system 50 sends the evaluation results to system 10. The evaluation results indicate that user U1 has privilege P1 for data item, corresponding to person A. For example, cache system may send a Boolean value of "true" to system 10 to indicate that privilege P1 is granted for the selected data item (i.e. Person A).

To render menu M1, system 10 also performs a privilege check for the remaining potential privileges P2-P10 (622). System 10 determines that privileges P1-P3 may be displayed in menu M1 for user U1 via the data security subsystem, shown in FIG. 3. System 10 thus displays privileges P1, P2, and P3 in menu M1 of the HRM application program for the set of selected data items (i.e., "Person A"). At 620, system 10 renders the action associated with privilege P1 when user U1 selects privilege P1 from menu M1.

At a later time (e.g., after cache system 50 has been updated at 612, 640), should user U1 decide to select Person A and invoke a privilege check for privilege P1, then cache system 50 is able to evaluate privilege P1 for Person A by information contained it its own memory contents. Since cache system 50 includes a list, which indicates that P1 has been checked, cache system 50 does not have to execute a query to database system 30. Instead, cache system 50 is able to examines its own memory contents and use a cached copy (606). As discussed above and shown at 640, cache system 50 contains Person A, and Privilege P1. Cache system 30 returns the results to system 10 (618), and allows the action to be performed (620). Since system 10 is able to retrieve this data from cache system 50, system 10 has avoided a more costly trip to database system 30 to retrieve this same information. When the privilege does not exist in the cache at 606 and privilege has been previously checked, system 10 returns to 608, 610 and 612 via 616.

In the event that user U1 selects Person B and invokes a privilege check for potential privileges P1-P10 for menu M1 (e.g., after cache system 50 has been updated at 612, 640), system 10 would perform a privilege check on privilege P1. System 10 checks cache system 50 (604). Cache system 50 checks the list of privileges, which have been checked, and determines that privilege P1 has previously been checked. Cache system 50 thus checks its own memory contents for this information. In this case, since cache system 50 has been configured to store the entire query result (Person A and P1; Person B and P1, Person C and P1, Person D, and P1, and Person E and P1) and not just the user's selection (i.e., Person A and P1) from the first privilege check for privilege P1, cache system 50 is able to conclude that user U1 is permitted to perform privilege P1 on Person B (614) from its own memory contents. Cache system 50 returns the results to system 10 (618), and allows the action to be performed (620) when selected by user U1. Again, a costly trip to database system 30 has been avoided by retrieving this same information from cache system 50.

In the event that system 10 needs to check privilege P2 as a potential action for person A (after cache system 50 has been updated at 612, 640), then a privilege check for person A and privilege P2 would be sent to cache system 50. Cache system 50 would check its list of privileges, which have been checked. Cache system 50 would determine that privilege P2 is not in its list since only privilege P1 has been checked at this point. Cache system 50 would not be able to retrieve this information from its cache contents, and thus has to execute a query to database system 30 to make this determination. FIG. 7 illustrates a manner of selectively populating cache system 50 to obviate the need to perform a query in this instance.

FIG. 7 illustrates a sequence diagram with respect to an HRM application program, illustrating the improved system performance that is gained using a cache system that is configured to store more than the query result. In this case, cache system 50 is configured to store the query result and an aggregate set of privileges, which are related to the current privilege that is being checked.

At 702, user U1 selects a set of data items (i.e., person A). The potential actions that can be displayed in menu M1 include privileges P1-P10. If these privileges are available to user U1, then privileges P1-P10 will be displayed in menu M1. To render menu M1 of potential actions for user U1, system 10 requests cache system 50 to perform a privilege check for the set of potential privileges.

At 704, system 10 requests cache system 50 to perform a privilege check for one of the privileges within the set of potential privileges. In this example, a privilege check is performed for privilege P1 based on the selected data items (i.e., person A). Cache system 50 checks if privilege P1 is stored in its memory by checking its list of privileges, which have been checked. The list is a set of cached privileges.

Since this is the first selection for this session, privilege P1 is not in the list. System 10 is unable to retrieve this information from cache system 50, and thus executes a query to database system 30 (708). Cache system is unable to use cached data, as shown at 706, at this time.

At 708, a query is executed. A query is performed for user U1 in role R1 based on privilege P1 for the set of selected data items (i.e., Person A). Database system 30 determines via the security infrastructure of FIG. 3 that user U1 has permission via privilege P1 to perform actions on Person A, Person B, Person C, Person D, and Person E (730). In other words, the query result includes a list of all data items on which user U1 has privilege P1, as shown at 730.

At 710, database system 30 returns the query result set (730) to cache system 50. The query result includes a list of all data items on which user U1 has privilege P1, as shown at 730. Upon receiving the query result set, cache system 50 is updated at 716.

At 716, cache system 50 is updated to include all of the information obtained from the query result set (730). In this regard, cache system 50 stores a primary key of each authorized data item. In this example, cache system 50 stores a primary key of Person A and corresponding privilege set {P1}; a primary key of Person B and corresponding privilege set {P1}; a primary key of Person C and corresponding privilege set {P1}; a primary key of Person D and corresponding privilege set {P1}; a primary key of Person E and corresponding privilege set {P1}.

Additionally, in this configuration, cache system 50 is configured to execute a query to determine privileges, which are related to the current privilege being checked at 712.

At 712, cache system 50 executes a query to determine all related privileges of the current privilege being checked. In this case, since privilege P1 is being checked, cache system 50 executes a query to determine all privileges, which are related to privilege P1.

A privilege is determined to be related to another privilege based on a number of criteria involving the security infrastructure. A privilege is related to the current privilege $P_i$ if the privilege satisfies the following criteria: (1) the privilege only belongs to the same aggregate set of privileges (e.g., menu) as privilege $P_i$; and (2) the privilege corresponds to the same secured object as privilege $P_i$.

Referring to the security subsystem of user U1 in FIG. 3, database system 30 determines that privileges P2 and P3 correspond to the same secured object O1 of P1. In addition, privileges P2 and P3 belong to the same set of aggregate privileges (menu M1) as privilege P1. Privileges P2 and P3 belong to menu M1, and no other set of aggregate privileges. Based on this evaluation, it is determined that privileges P2 and P3 are related privileges of privilege P1, as shown at 740.

At 714, the results of this query are returned to cache system 50. The results of the query include the aggregate set of privileges P1, P2, and P3. Upon receiving the query result, cache system 50 is updated at 716.

At 716, cache system 50 is updated to include all of the information obtained from query result set, shown at 740. In this regard, for all authorized data items of the aggregate privilege set (e.g., Person A, Person B, Person C, Person D, and Person E), cache system 50 adds all related privileges (i.e., privileges P2 and P3) of the current privilege being checked (i.e., privilege P1) to the privilege set. In this example, cache system 50 adds related privileges P2 and P3 to the privilege set of each authorized data item.

As illustrated at 750 of FIG. 7, when updated, cache system 50 contains a primary key of Person A and corresponding privilege set {P1, P2, P3}; a primary key of person B and corresponding privilege set {P1, P2, P3}; a primary key of person C and corresponding privilege set {P1, P2, P3}; a primary key of person D and corresponding privilege set {P1, P2, P3}; a primary key of person E and corresponding privilege set {P1, P2, P3}.

Additionally, cache system 50 updates the list of privileges, which have been checked. The list is a set of cached privileges, indicating every privilege that has been checked for a session. The updated list now indicates that privilege P1 has been checked, and related privileges.

At 720, cache system 50 evaluates its data and determines that privilege P1 may be performed on Person A. Cache system 50 determines that privilege P1 may be performed on Person A because cache system 50 now indicates that Person A is one of the data items on which user U1 has permission to perform privilege P1.

At 722, cache system 50 sends results to system 10. These results are based on the evaluation of 720. For example, in response to the initial privilege check of Person A and privilege P1, cache system 50 sends results to indicate that user U1 has permission to perform an action, associated with privilege P1, for the selected data item (i.e., Person A). This result may be returned in the form of a Boolean value, such as a value of "true" to system 10.

To render menu M1, a privilege check has to be performed on the remaining potential privileges P2-P10, which could possibly be displayed in menu M1 depending upon the predetermined security policies. In performing these additional privilege checks, the process proceeds to 724.

At 724, the process proceeds to iterate substantially through the same general process, discussed above, for the next privilege to be checked. However, when performing a privilege check for privileges P2 and P3, respectively, cache system 50 is able to proceed to 706. Cache system 50 is able access its own memory contents to evaluate whether the current user holds privileges P2 and P3 for the set of selected data items since cache system 50 is selectively populated with a privilege set that contains the aggregate set of privileges. When a privilege check was performed for privilege P1, as discussed above, cache system 50 also stored privileges P2 and P3 for all authorized data items associated with that aggregate set of privileges.

Once each of the potential privileges (e.g., privileges P1-P10) have been checked, the HRM application program displays privilege P1, as well as P2-P3, in menu M1 in accordance with the security infrastructure of FIG. 3. When the privilege does not exist in the cache at 706 and privilege has been previously checked, system 10 returns to 708, 710 and 712, 714 and 716 via 718.

At 726, system 10 renders the action associated with privilege P1 when user U1 selects privilege P1 from menu M1 for the selected data item (e.g., Person A).

At a later time (e.g., after cache system has been updated at 716, 750), should user U1 decide to select Person A and check privilege P1, then system 10 checks to see if this data is in cache system 50. The list or set of cached privileges, which have been checked, is examined. Since the list indicates that privilege P1 has been already been checked for this session, then cache system 50 examines its memory contents. As indicated above, cache system 50 contains Person A, and Privilege P1. Consequently, cache system 50 is able to access this cached data and avoid a costly trip to the database in this instance. Cache system 50 returns the results to system 10, and allows the action to be rendered when selected in menu M1.

In the event that the user would like to select Person B and check privilege P1 (e.g., after cache system has been updated at 716, 750), cache system 50 would be checked. Cache system 50 checks the list, which indicates that privilege P1 has been previously checked. Cache system 50 thus performs a privilege check with respect to its own memory contents. In this case, since the cache system 50 has been configured to store the entire query result along with related privileges, the cache contents indicate that user U1 is permitted to perform P1 on Person B. Cache system 50 returns the results to system 10, and allows the action to be performed when selected. In this instance, system 10 has been able to retrieve this data from the cache system 50, and has avoided a more costly trip to database system 30 to retrieve this same information.

In the event that system 10 needs to check privilege P2 as a potential action for person A and person D (e.g., after cache system has been updated at 716, 750), then system 10 checks cache system 50. Cache system 50 checks its list of privileges, which have been checked. The cache will be updated with all the primary keys/IDs the user is able to access for each privilege checked. An evaluation is done in 720 to determine if the selected ID is in the set of ID returned by the query. By storing the aggregate set of privileges (i.e., P1, P2, and P3) to which P1 belongs, cache system 50 would be able to determine that privilege P2 may be rendered for Person A and person D based on its initial privilege check for P1, discussed above, without having to perform a new query for P2 based on the new selection of data items (i.e., person A and person D). A costly trip to the database has been saved in this instance.

Figure 8:
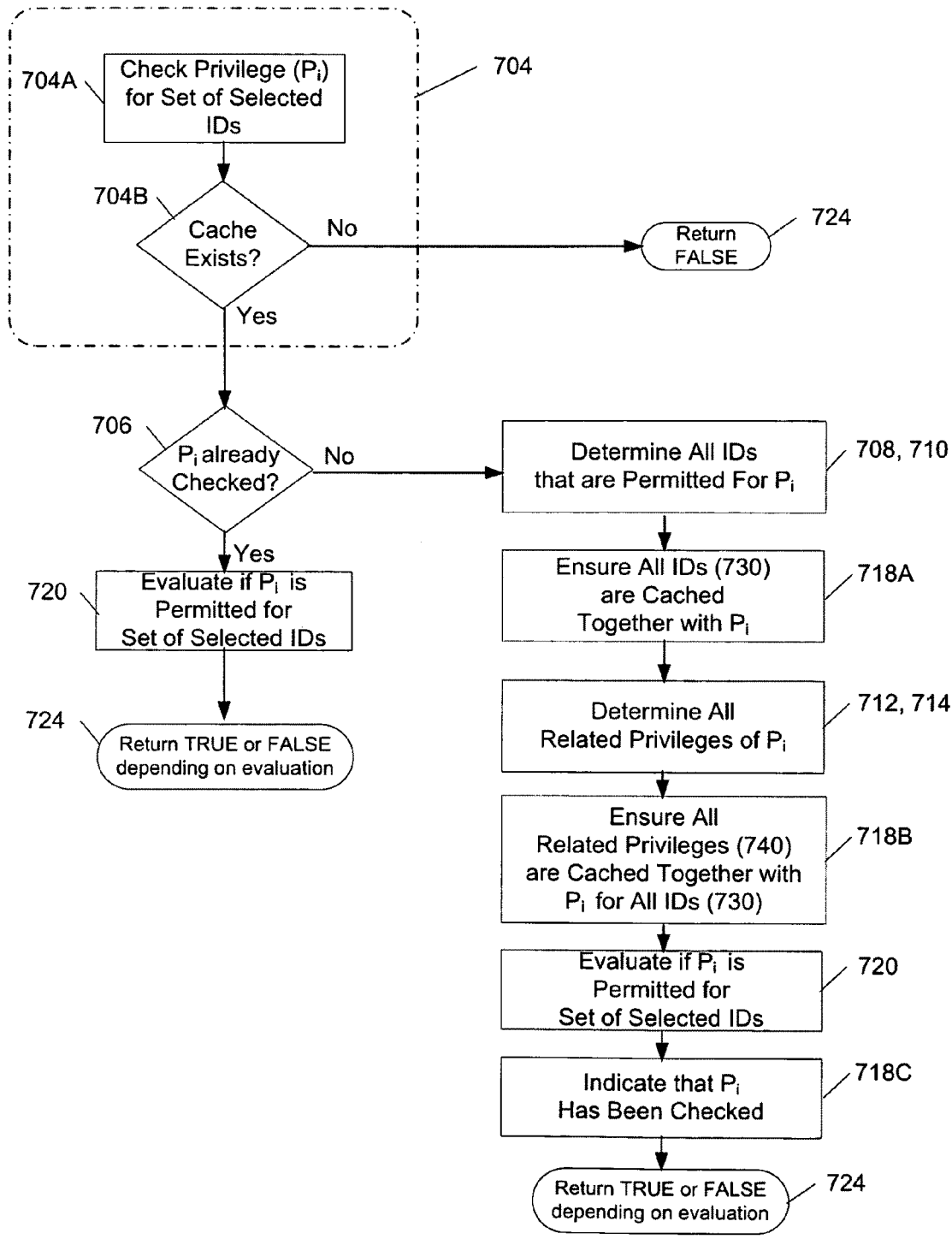
FIG. 8 is a flow diagram illustrating the operations of the cache system in association with a privilege check in accordance with one embodiment.

FIG. 8 is a flow chart illustrating the overall process that is being performed, for example, with respect to FIG. 7. As illustrated in FIG. 7, an application program may receive a stimulus, which invokes system 10 to perform a privilege check for a certain privilege.

As shown in FIG. 8, privilege cache manager begins the process, shown at 704, comprising 704A and 704B.

At 704A, privilege cache manager receives a request to perform a privilege check for privilege $P_i$. A privilege check serves to determine if a particular user may perform a particular privilege (e.g., a function) on a set of selected data items (e.g., set of "selected IDs"). Consequently, a privilege check may invoke a command that receives parameters, such as a privilege cache name (or a secured object name), a privilege to be checked, and a set of IDs to check.

The privilege check command may include a privilege cache name to identify a privilege cache within cache system 50, which may contain information pertaining to the set of selected IDs and the privilege to be checked. As illustrated in FIG. 2, there may be a number of privilege caches. Each privilege cache may be configured to take the name of a secured object in database system 30, and may include data pertaining to that particular secured object. As discussed above, when system 10 is able to retrieve information pertaining to data/function security via cache system 50, system 10 is able to provide application program 42 with significant performance gains.

The privilege check indicates the privilege to be checked. The privilege may be identified by a privilege name. The privilege to be checked may be invoked in a number of ways in accordance with security objectives in a manner, which is suitable for application program 42. When applied to the HRM application program employing a dynamic menu of security privileges for a random selection of data items, as discussed in FIGS. 4-7, a software component may be set up to check one or more potential privileges when at least one data item is selected from the HRM application program.

The privilege check includes a set of selected data items. A data item may refer to an object ID, which corresponds to a primary key. In the simplified examples discussed above, a data item referred, for example, to person A. The set of selected data items may include one or more object IDs. A privilege check may be performed on a single data item, or a set of data items. In order to perform privilege $P_i$ on a single data item, then the privilege check must indicate that privilege $P_i$ can be performed on that single data item. In order to perform privilege $P_i$ on a set of data items, then the privilege check must indicate that privilege $P_i$ can be performed on each and every data item within the set. If privilege $P_i$ cannot be performed on at least one of the data items within the set, then privilege $P_i$ cannot be performed for the set of selected IDs.

At 704B, privilege cache manager checks to see if a privilege cache exists for the cache name, which was received in the privilege check command. If a privilege cache does not exist, then the cache manager returns a value of "false." A value of "false" may indicate that a cache needs to be set up. Developers may add privilege caches to the cache system by calling a function to add a cache. In calling this function, developers may need to supply parameters, such as the Security View Object, the name of the object to secure, an optional alias to the object to secure, and the primary key. Alternatively, if a privilege cache exists, then the privilege cache proceeds to perform the privilege check (706).

At 706, privilege cache checks to see if privilege $P_i$ has already been checked within the given session. Privilege cache may make this determination, for example, by consulting a list of privileges, which have been checked or cached. Each privilege cache may maintain a list of privileges, which have been checked. Once a privilege has been checked, then the privilege is entered in the list of privileges. If privilege $P_i$ has been checked, then the process proceeds to 720. If the privilege has not been checked, then the process proceeds to execute a query 708, and receive query results 710.

Figure 9A:
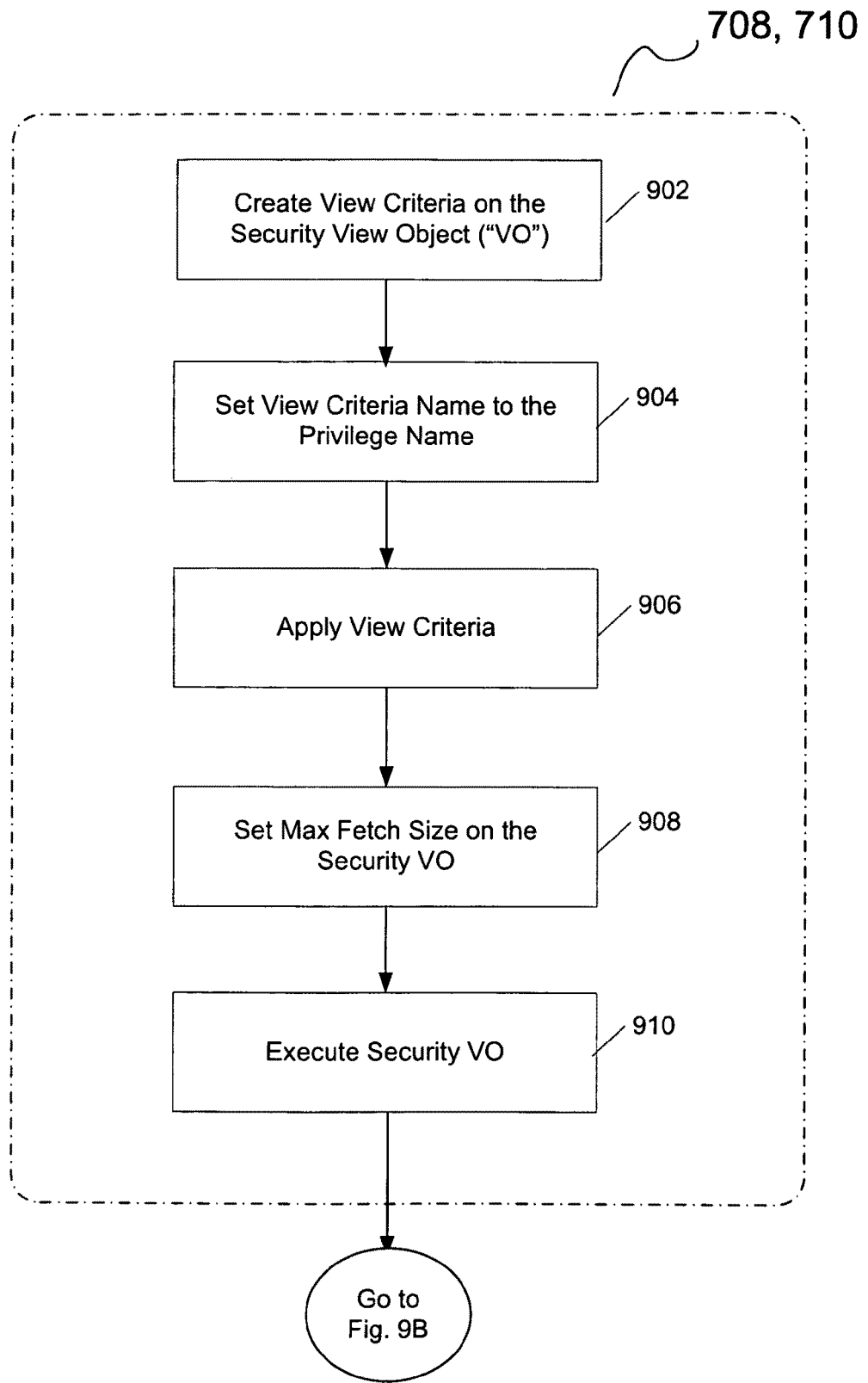
FIGS. 9A-9E are flow diagrams illustrating certain aspects of FIGS. 7-8 in accordance with one embodiment.

At 708 and 710, upon determining that privilege $P_i$ has not been checked within the given session, privilege cache determines all IDs that are permitted to be performed for privilege $P_i$. FIG. 9A illustrates a method of determining all IDs, which are granted for privilege $P_i$ in accordance with one embodiment.

Figure 9B:
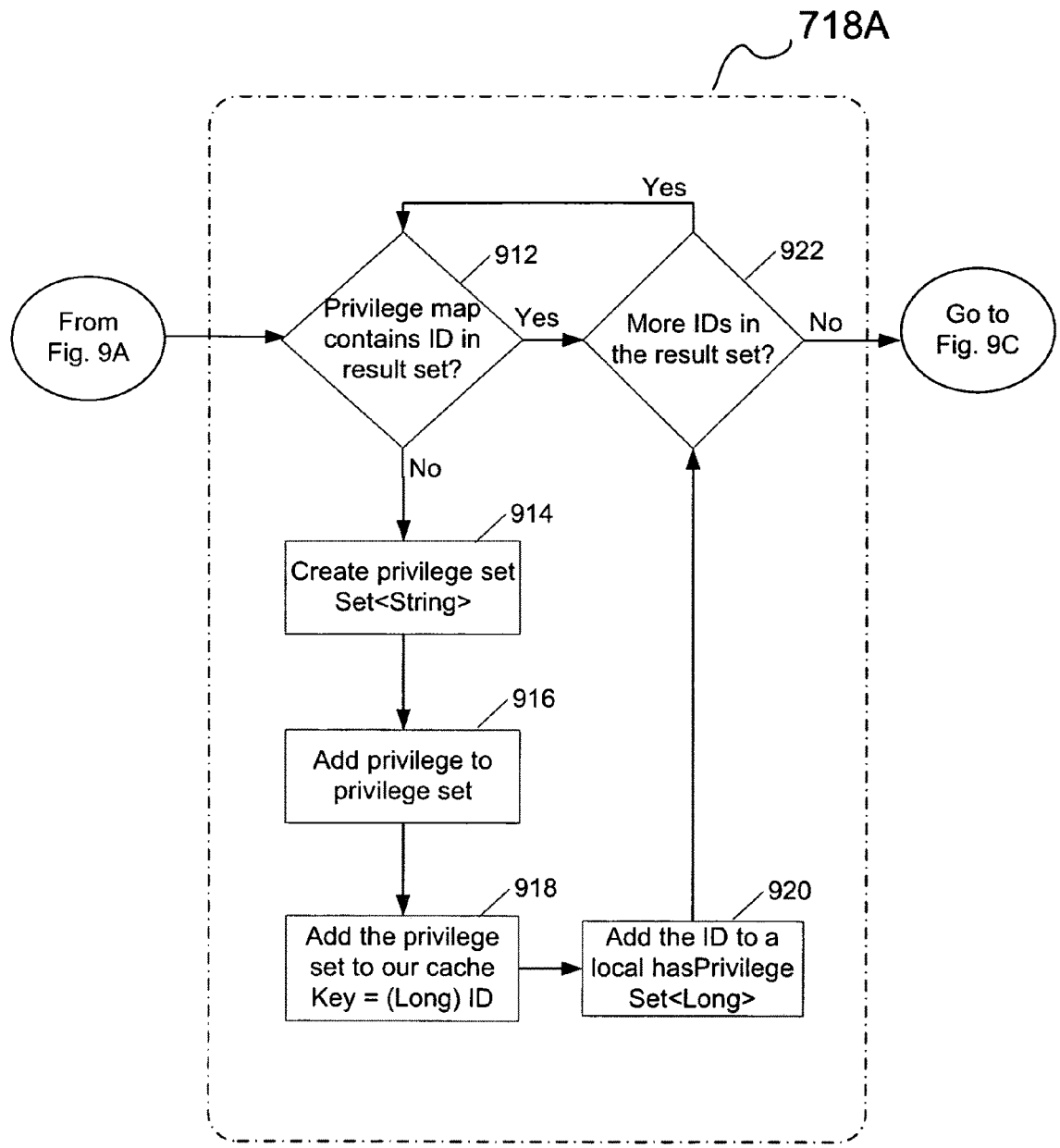

At 718A, privilege cache ensures that all IDs, determined at 708 and 710, are cached together with privilege $P_i$. An example of caching privilege $P_i$ with all IDs is illustrated at 750 of FIG. 7. FIG. 9B illustrates a method of ensuring that all IDs, determined at 708, 710, are cached together with privilege $P_i$.

Figure 9C:
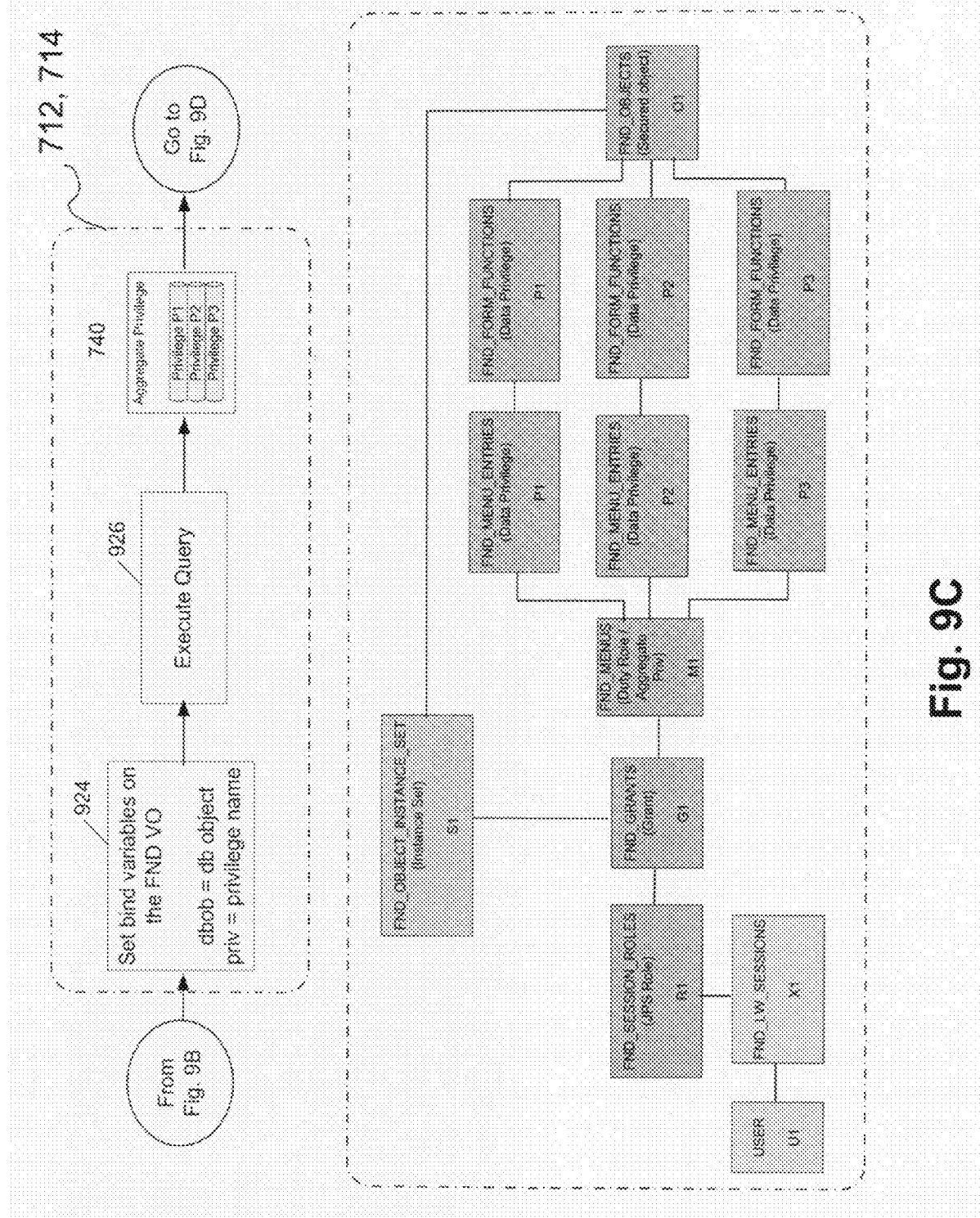

At 712, 714, privilege cache determines all privileges, which are related to privilege $P_i$. A privilege is considered to be related to privilege $P_i$ if (1) the privilege only belongs to the same aggregate set of privileges as privilege $P_i$; and (2) the privilege refers to the same secured object as privilege $P_i$. FIG. 9C illustrates a method of determining all privileges, which are related to privilege $P_i$.

Figure 9D:
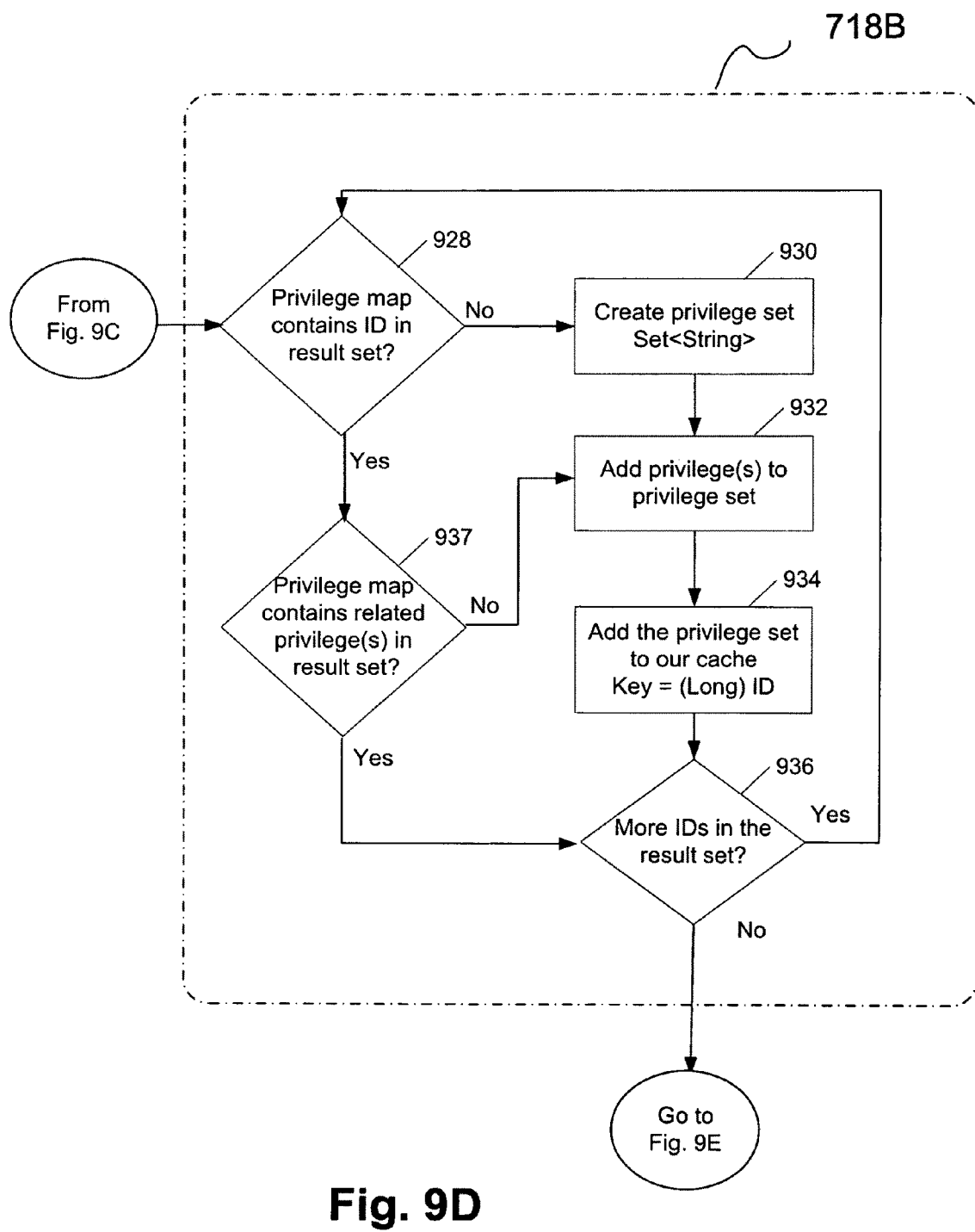

At 718B, privilege cache ensures that all related privileges, determined at 712, 714, are cached together with privilege $P_i$ for all IDs, determined at 708, 710. An example of caching privilege $P_i$ with all related privileges for all IDs is illustrated at 740 of FIG. 7. FIG. 9D illustrates a method of determining all privileges, which are related to privilege $P_i$ in accordance with one embodiment.

Figure 9E:
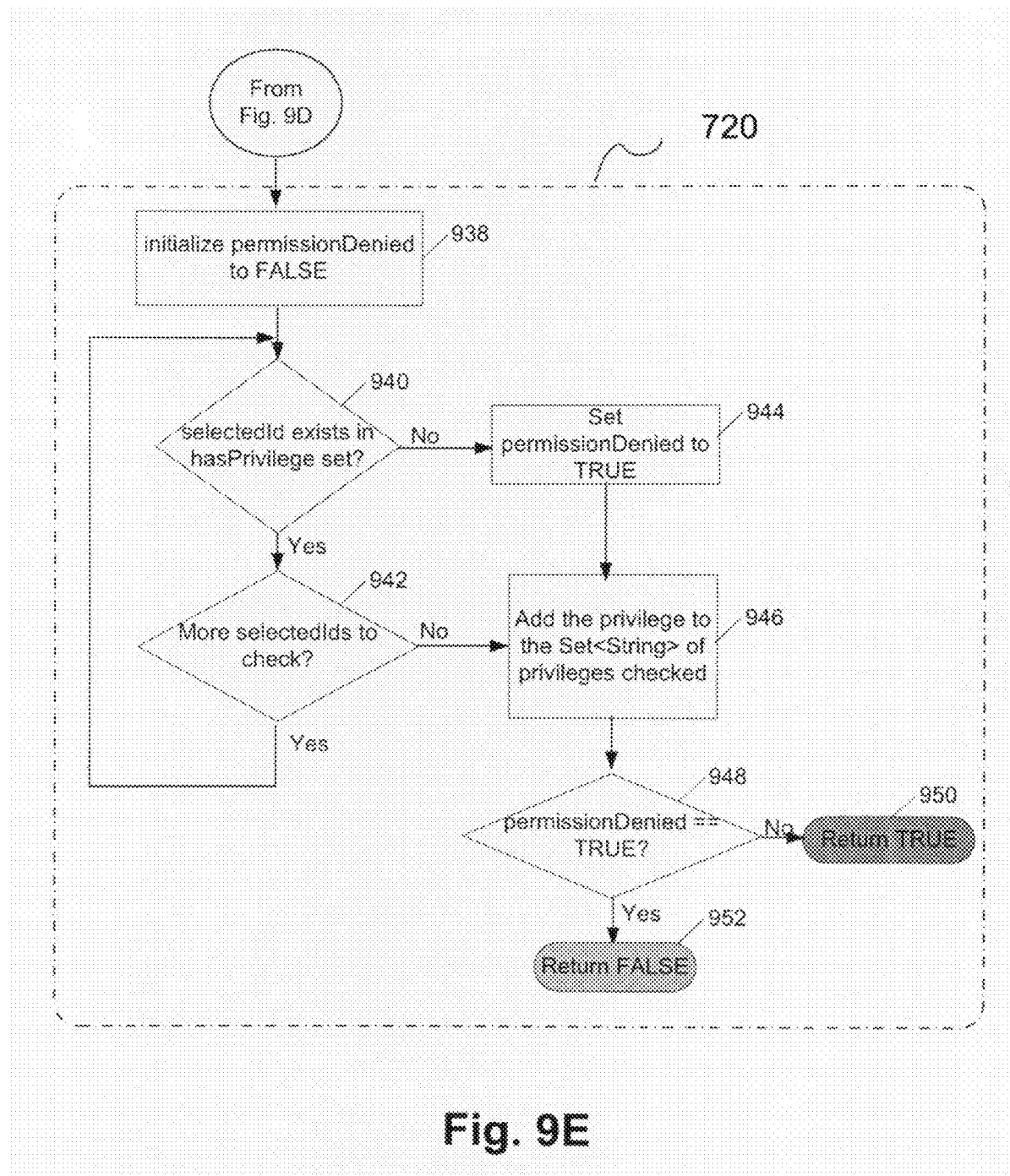

At 720, privilege cache evaluates if privilege $P_i$ is permitted for the set of selected IDs. FIG. 9E illustrates a method of evaluating if privilege $P_i$ is permitted for the set of selected IDs in accordance with one embodiment.

At 718C, privilege cache indicates that privilege $P_i$ has been checked. As discussed at 706, a privilege cache may maintain a list of privileges, which have been checked.

At 724, privilege cache returns the evaluation result to system 10. For example, the evaluation result may indicate a value of "true" if privilege $P_i$ is determined to be permitted for the set of selected IDs. In the alternative, the evaluation result may indicate a value of "false" if privilege $P_i$ is not permitted for the set of selected IDs.

As discussed above, FIGS. 9A-9E illustrate methods of implementing certain aspects of FIGS. 7-8. FIG. 9A illustrates a method of determining all IDs, which are granted for privilege $P_i$ in accordance with one embodiment. As illustrated in FIG. 9A, the method includes setting up the query (902, 904, 906, and 908) to database system 30 and executing the query 910. The results of the query are used to determine all IDs that are authorized for user U1 based on privilege $P_i$.

At 902, the privilege cache creates view criteria on the security view object. A security view object enables data to be retrieved from a data source, such as a database. In general, a security view object may include a component that encapsulates an SQL query. View criteria, generally, filter the data of the security view object.

At 904, the privilege cache sets the view criteria name to the name of privilege $P_i$. View criteria, which includes privilege $P_i$, will filter data based on privilege $P_i$, thereby permitting only data accessible via privilege $P_i$ to be viewed.

At 906, the view criteria is applied to the security view object, thereby ensuring that the appropriate data is accessed.

At 908, the security view object is configured to return the maximum fetch size for every query. In other words, the query is set to return all of the object IDs on which user U1 is permitted to perform privilege $P_i$. All IDs, which are granted to user U1 with privilege $P_i$, must be returned to render the correct evaluation result in every instance.

At 910, the query is executed. The query result set will contain a listing of all of the IDs that user U1 is authorized to perform privilege $P_i$ on. Once the results of the query are received, privilege cache proceeds to ensure that the results of the query are stored in cache system 50, as explained in FIG. 9B.

FIG. 9B illustrates a method of ensuring that all IDs, determined at 708, 710, are cached together with privilege $P_i$.

At 912, privilege cache determines if the privilege map contains the ID in the query result. The Privilege map is contained in the privilege cache. If it is determined that the privilege map contains the ID in the result set, then the process proceeds to 922. In the instance that the object ID is in the privilege cache, then it is understood that the privilege set is also already contained in the privilege cache and the process does not have to progress through 914, 916, and 918, since it is implied that these steps were previously performed pursuant to an earlier query. If it is determined that the privilege map does not contain the ID in the result set, then the process proceeds to 914.

At 914, privilege cache creates a privilege set for the ID mentioned at 912. Privilege cache stores the ID in association with a set of privileges, which are authorized for that ID.

At 916, privilege cache adds privilege $P_i$ to the privilege set.

At 918, the privilege set {$P_i$} is added to the privilege cache of cache system 50.

At 920, privilege cache adds the ID of 912 to a local set of the query results (referred to herein as the "Has Privilege" set). The local "Has Privilege" set includes a temporary copy of all of the IDs on which privilege $P_i$ is available for the current session. This temporary copy of all of the authorized object IDs for privilege $P_i$ is used to evaluate whether each selected data item is authorized for privilege $P_i$ in the particular scenario or instance in which it is being checked.

At 922, the privilege cache determines if each of the object IDs of the result set have been checked. If there are more object IDs in the query result set to be checked, then privilege cache checks the next ID in the result set. If all of the IDs have been checked at 912, then the process proceeds to determine all related privileges of privilege $P_i$, as shown in FIG. 9C.

FIG. 9C illustrates a method of determining all privileges, which are related to privilege $P_i$. FIG. 9C includes a portion of FIG. 3, illustrating a mapping of role R1 of user U1 to secured object O1, to assist in the explanation of determining related privileges.

At 924, bind variables are applied to the view object functionality. In general, bind variables are substitution variables that are used in place of literal values. Certain variables within the query, such as a database object (which may be referred to as bind variable "dbob") and a privilege name (which may be referred to as "priv"), may be applied as bind variables. Applying bind variables to the view object functionality may result in a number of software performance gains, such as reduced query statements and reduced parsing operations.

At 926, a query is executed to database system 30. The query is set to determine if privilege $P_i$ has any related privileges.

After the query is executed, privilege cache receives a list of related privileges from database system 30. Results of the query, for the example shown in FIG. 7, are illustrated in 740. Once the results of the query are received, privilege cache proceeds to ensure that the results of the query are stored in cache system 50, as explained in FIG. 9D.

FIG. 9D illustrates a method of ensuring that all related privileges, determined at 740, are cached together with privilege $P_i$, in association with each of corresponding ID.

At 928, privilege cache determines if the privilege map contains an ID, obtained from the result set of query 926. If it is determined that the privilege map does not contain the ID, then the process proceeds to 930. If it is determined that the privilege map contains the ID, then the process proceeds to 937.

At 930, upon determining that an ID in the result set does not have an entry in the privilege map, then privilege cache creates an entry in the privilege map for the ID. Privilege map may create a privilege set, which contains the privileges that the user is authorized to perform on the ID.

At 932, privilege cache adds the privilege to the privilege set.

At 934, the privilege set is added to the privilege cache.

At 936, if there are any more IDs in the result set, associated with query 924, then the privilege cache continues to check to see if each ID in the result set is in the privilege map at 928. This process continues until all of the IDs have been checked at 936. In the event that there are no more IDs in the result set to check, then the process proceeds to 938 of 9E.

At 937, it is determined if the privilege map contains related privilege(s) in the result set. If yes, the process proceeds to 936. If no, the process proceeds to 932.

FIG. 9E illustrates a method of evaluating if privilege $P_i$ is permitted for the set of selected IDs in accordance with one embodiment.

At 938, a flag is initialized. In this case, the flag indicates that the permission has been granted (i.e., "permissionDenied is false").

At 940, each of the selectedIDs are checked to see if they are in the "Has Privilege" set. If the selectedID is not in the local "Has Privilege" set (920), then the process proceeds to 944.

At 944, the flag, initialized at 938, is set to "true," indicating that the privilege does not exist for that ID, and that permission is denied.

At 942, it is determined if all of the selected IDs have been checked. If there are more selected IDs that need to be checked, but have not been checked, then the process proceeds to check the selected ID at 940. If each of the selected IDs have been checked at 940 and there are no more selected IDs to check, then the process proceeds to 946.

At 946, the privilege cache adds the privilege to the list of privileges, which have been checked. Thus, during a subsequent privilege check, privilege cache is able to consult this updated list of privileges at 704.

At 948, the flag is checked. If the flag indicates that permission has been denied, then the user does not have the privilege for the selectedIDs. If the flag indicates that permission has been granted, then the privilege for the selectedIDs is available to the user, and thus a value of "true" is returned to indicate that privilege $P_i$ is granted to the user for the selectedIDs.

As discussed above, privilege cache checks its memory to see if the privilege exists for a selected ID within the set of IDs. If the cache determines that the privilege does not exist for the selected ID, then the process returns a value of "false" (950). A value of "false," indicates that the user does not have access to that action, and the menu will not display that action as being available to the user.

Privilege cache checks each ID within the set of IDs to determine if the privilege exists for it. If the privilege does not exist for any one of the selected IDs within the set of IDs, then the process returns a value of "false." The privilege only exists for a set of selected IDs if the privilege is available, individually, to each of the selected IDs.

A schematic representation of the cache system, as a tree of maps, is illustrated in FIG. 10. FIG. 10 illustrates a class diagram in Unified Modeling Language ("UML"). The class diagram represents each class by a rectangular structure, which is divided into three compartments. The first or top compartment represents a class name. The second or middle compartment represents attributes and corresponding attribute types of the class. The third compartment represents the operations of the class.

In addition, each class may be associated with another class within the class diagram. Associations are denoted by a connection or link between one class and at least one other class. Notations such as "1" at one class followed by a bidirectional link to "1 . . . *" at another class indicates an association of "one" instance of a class to "one or more" instances of another class. As illustrated in FIG. 10, cache system 50 may be implemented by an object-oriented programming language.

In this class diagram, privilege cache manager 1000 resides at the top of the tree. Privilege cache manager includes the following attributes: a cache map ("cacheMap") and a view object functionality ("fndvo"). The attribute type of the cache map is defined by "Map" class 1002. The cache map indicates if the privilege resides in a privilege cache. Privilege cache map includes keys of database object names. Cache map includes a number of privilege caches. The attribute type of the view object functionality ("fndvo") is defined by the "FndPrivilegeVO" class of 1004. As indicated at 1004, FndPrivilegeVO provides a mechanism to query the database to determine related privileges of the current privilege, which is being evaluated by cache system 50. As an example, the view object functionality may include a Structured Query Language ("SQL") mechanism that queries database system 30 to determine related privileges of a privilege, which has invoked the privilege check and which is currently being checked by cache system.

Privilege cache manager is enabled to perform an add operation and a check privilege operation. Privilege cache manager is configured to add a privilege cache (e.g., secured object) to cache system 50. Privilege cache manager also enables a privilege to be checked and a Boolean value (e.g. true or false) to be returned based on results of the privilege check.

A privilege cache may include a database object name, an alias, a primary key, view object functionality, and a privilege map. Each privilege cache is configured to determine if it contains information relating to a privilege (via "contains" function), obtain information in the privilege cache pertaining to the privilege (via "get" function), and store information pertaining to the privilege (via "put" function). Privilege cache enables a privilege to be checked (via checkprivilege), and enables related privileges to be cached (via cacheRelatedPrivileges). A privilege map is configured to store a number of primary keys (e.g., object IDs) and corresponding privilege sets. The privilege set includes privileges, which have been granted based on predetermined security policies. Each privilege set may contain a number of privileges, which are referenced by data privilege names.

As disclosed, an embodiment of the cache system is configured to provide rapid access to a privilege, and data associated with the privilege. By accessing this data from a privilege cache, the system does not have to make a roundtrip to the database to retrieve this data. This results in enhanced system performance and speed.

In addition, the privilege cache building process is accelerated by creating cache entries based upon a "privilege bloom." A privilege bloom refers to being able to cache a menu of privileges (i.e., an aggregate set of privileges) when a privilege check command is invoked for a single privilege. A substantial amount of time may be saved in the event that there is a high likelihood that a related privilege will be requested by the processor shortly after a privilege bloom created an entry for this related privilege in the cache system.

Several embodiments are specifically illustrated and/or described herein. However, it will be appreciated that modifications and variations are covered by the above teachings and within the purview of the appended claims without departing from the spirit and intended scope of the invention.

What is claimed is:

1. A non-transitory computer readable medium having instructions stored thereon that, when executed by a processor, causes the processor to:

in response to a first user selection from a user of one or more data items and a current privilege, execute a query to a database system to determine all data items of an application that the user is authorized to perform the current privilege on, wherein the first user selection comprises selected identities of the selected one or more data items, and the query is based on receiving a primary key for each selected data item, wherein the first user selection is received from the user interacting with a user interface;

receive results of the query that includes the current privilege and the corresponding all authorized data items of the current privilege, wherein the all authorized data items include data items in addition to the user selected data items, and the results include identities of the additional data items in addition to the selected identities;

store in a cache system the results of the query;

wherein the current privilege comprises one or more actions that may be performed on the authorized data items by the user within the application based at least on a role of the user;

receive a second user selection from the user, after the results of the query are stored in the cache system, for a second data item of the authorized data items of the current privilege, wherein the second data item is different from the one or more data items of the first user selection;

in response to the second user selection, determining from the results of the query stored in the cache system that the current privilege can be performed on the second data item, wherein the determining comprises evaluating if the current privilege is authorized by comparing the second data item with all authorized data items stored in the cache system.

2. The computer readable medium of claim 1, wherein the computer readable medium further includes instructions that cause the processor to:

send results of the evaluation to an application program to indicate that the current privilege is not accessible to the user.

3. The computer readable medium of claim 1, wherein the authorized data items comprise primary keys within the database system.

4. The computer readable medium of claim 1, wherein the instructions cause the processor to execute the query upon determining that the current privilege has not already been checked for a session.

5. The computer readable medium of claim 1, wherein the instructions further cause the processor to store the current privilege in a set of cached privileges for a session.

6. The computer readable medium of claim 5, wherein the instructions further cause the processor to:

check the set of cached privileges when a next privilege is to be checked; and use each stored data item and associated privilege set in the cache system if the next privilege is in the set of cached privileges; and execute a new query to the database system to determine all data items that are accessible based on at least a next privilege and the current user if the next privilege is not in the set of cached privileges.

7. A cache system for providing rapid access to information pertaining to a privilege check, said cache system comprising non-transitory computer readable media having instructions stored thereon that, when executed by a processor, are configured to execute a method comprising:

receiving a request at a privilege cache manager, in response to a first user selection from a user of a current privilege and one or more data items, to perform a privilege check for the current privilege and a current set of selected data items of an application, wherein the first user selection comprises selected identities of the selected one or more data items, and the query is based on receiving a primary key for each selected data item, wherein the first user selection is received from the user interacting with a user interface;

receiving the privilege check request from the privilege cache manager at a privilege cache;

evaluating if the current privilege is permitted for the current set of selected data items based on data stored in the privilege cache if the current privilege has already been checked; and performing a query to a database system to determine if the current privilege is permitted for the current set of selected data items if the current privilege has not been already checked and to determine all authorized data items of the current privilege, wherein the all authorized data items include data items in addition to the user selected data items and the results include identities of the additional data items in addition to the selected identities;

storing in the cache system the results of the query;

receiving a second user selection from the user, after the results of the query are stored in the cache system, for a second data item of the authorized data items of the current privilege, wherein the second data item is different from the one or more data items of the first user selection;

in response to the second user selection, determining from the results of the query stored in the privilege cache that the current privilege can be performed on the second data item;

wherein the current privilege comprises one or more actions that may be performed on the current set of selected data items by the user within the application based at least on a role of the user.

8. The cache system of claim 7, wherein the data that is stored in the privilege cache includes data items and corresponding privilege sets, wherein each privilege set includes at least one privilege.

9. The cache system of claim 8, wherein the privilege cache is configured to perform operations that include:

receiving results from the query that include all authorized data items of the current privilege associated with a current user;

ensuring that all authorized data items are stored in the cache system;

for each of the authorized data items, ensuring that the current privilege is stored in each corresponding privilege set of the authorized data item.

10. The cache system of claim 9, wherein the privilege cache is configured to perform operations that include:

performing the query to the database system to determine if the current privilege has any related privileges, wherein a related privilege is a privilege that belongs to the same set of aggregate privileges as the current privilege and does not belong to any other sets of aggregate privileges;

receiving results from the query that includes all related privileges of the current privilege;

ensuring that each related privilege is stored in each corresponding privilege set of each authorized data item.

11. A computer implemented method for a cache system, said method comprising:

determining whether a current privilege selected by a user interacting with a user interface has previously been checked for a given session;

if the current privilege has previously been checked for that session, then:
 accessing information in the cache system; and
if the current privilege has not previously been checked for that session, then:
 updating the cache system by:

receiving all data items of an application that are accessible for the current privilege in response to a first user selection of one or more data items from a user and the current privilege, wherein the first user selection comprises selected identities of the selected one or more data items, and the query is based on receiving a primary key for each selected data item, and by performing a query to a database system to determine if the current privilege is permitted for the one or more data items and to determine all authorized data items of the current privilege, wherein the all authorized data items include data items in addition to the user selected data items, wherein the first user selection is received from the user interacting with the user interface;

storing each authorized data item in the results of the query in association with a privilege set in the cache system, the privilege set being configured to include at least one privilege that is granted for each stored data item within the session; and storing the current privilege in the privilege set of each stored data item;

receiving a second user selection from the user, after the results of the query are stored in the cache system, for a second data item of the authorized data items of the current privilege, wherein the second data item is different from the one or more data items of the first user selection;

in response to the second user selection, determining from the results of the query stored in the cache system that the current privilege can be performed on the second data item, wherein the determining comprises evaluating if the current privilege is authorized by comparing the second data item with all authorized data items stored in the cache system;

wherein the privilege set comprises one or more actions that may be performed on the authorized data items within the application based at least on a role of the user.

12. The method according to claim 11, wherein updating the cache further comprises:

receiving all related privileges of the current privilege, wherein a related privilege belongs to the same aggregate set of privileges as the current privilege.

13. The method according to claim 12, further comprising:

storing all related privileges in the privilege set of each data item.

14. The method according to claim 11, wherein updating the cache further comprises:

storing the current privilege in a set of cached privileges, the set of cached privileges indicating each privilege that has been checked for the session.

15. The method according to claim 11, wherein the information in the cache system includes at least one data item and corresponding privilege set, the corresponding privilege set containing the current privilege.

16. A computer implemented method for a cache system, the method comprising:

in response to a first user selection from a user of one or more data items and a current privilege, executing a query to a database system to determine additional data items of an application that the user is authorized to perform the current privilege on, wherein the first user selection comprises selected identities of the selected one or more data items, and the query is based on receiving a primary key for each selected data item, wherein the first user selection is received from the user interacting with a user interface;

receiving results of the query that includes the current privilege and the corresponding additional authorized data items of the current privilege, wherein the all authorized data items include data items in addition to the user selected data items, and the results include identities of the additional data items in addition to the selected identities;

storing in the cache system the results of the query;

wherein the current privilege comprises one or more actions that may be performed on the authorized data items by the user within the application based at least on a role of the user;

receiving a second user selection from the user, after the results of the query are stored in the cache system, for a second data item of the authorized data items of the current privilege, wherein the second data item is different from the one or more data items of the first user selection;

in response to the second user selection, determining from the results of the query stored in the cache system that the current privilege can be performed on the second data item, wherein the determining comprises evaluating if the current privilege is authorized by comparing the second data item with all authorized data items stored in the cache system.

17. The method of claim 16, further comprising:
sending results of the evaluation to an application program to indicate that the current privilege is not accessible to the user.

18. The computer readable medium of claim 1, wherein the query further determines for the selected data items additional other users that are authorized to perform the current privilege and stores the additional other users in the cache system.

19. The computer readable medium of claim 1, wherein the query further determines for the selected data items additional other privileges for the user and stores the additional other privileges in the cache system.

20. The method of claim 11, wherein the query further determines for the selected data items additional other users that are authorized to perform the current privilege and stores the additional other users in the cache system.

21. The method of claim 11, wherein the query further determines for the selected data items additional other privileges for the user and stores the additional other privileges in the cache system.

* * * * *